US010222868B2

(12) United States Patent
Martinez Fernandez et al.

(10) Patent No.: US 10,222,868 B2
(45) Date of Patent: Mar. 5, 2019

(54) WEARABLE DEVICE AND CONTROL METHOD USING GESTURES

(71) Applicant: SAMSUNG ELECTRONICS CO., LTD., Suwon-si (KR)

(72) Inventors: Raul Martinez Fernandez, Madrid (ES); Fernando Fernandez Hidalgo, Madrid (ES); Alfredo Cerezo Luna, Madrid (ES); Pablo Abelardo Martinez Andres, Madrid (ES); Debora Gomez Bertoli, Madrid (ES); Francisco Jose Calvo Fernandez, Madrid (ES)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/728,194

(22) Filed: Jun. 2, 2015

(65) Prior Publication Data
US 2015/0346834 A1 Dec. 3, 2015

(30) Foreign Application Priority Data

Jun. 2, 2014 (ES) .................................. 201430836
Jun. 2, 2015 (KR) ........................ 10-2015-0078090

(51) Int. Cl.
G06F 3/01 (2006.01)
G08C 17/02 (2006.01)
(Continued)

(52) U.S. Cl.
CPC ............ G06F 3/017 (2013.01); G06F 1/1694 (2013.01); G06F 3/014 (2013.01); G06F 3/0487 (2013.01);
(Continued)

(58) Field of Classification Search
CPC ....... G06F 17/30032; G06F 2200/1636; G06F 1/1694; G06F 3/017; G06F 3/011;
(Continued)

(56) References Cited

U.S. PATENT DOCUMENTS 6,590,536 B1    7/2003  Walton
2009/0265671 A1* 10/2009  Sachs .................. G06F 3/03545
                                                        345/179
(Continued)

FOREIGN PATENT DOCUMENTS

CH    706077 A2    7/2013
EP  2 590 055 A2    5/2013
(Continued)

OTHER PUBLICATIONS

Communication dated Mar. 14, 2016 issued by the European Patent Office in counterpart European Patent Application No. 15170361.8.
(Continued)

Primary Examiner — Dionne H Pendleton
(74) Attorney, Agent, or Firm — Sughrue Mion, PLLC

(57) ABSTRACT

A portable device includes: a sensor configured to detect a gesture of a user carrying the portable device; a control unit configured to identify the detected gesture, determine an external device corresponding to the identified gesture based on the identified gesture, and determine an order for controlling the external device; and a communication unit configured to transmit a command signal corresponding to the order to the external device.

21 Claims, 28 Drawing Sheets

(51) Int. Cl.
*G06F 1/16* (2006.01)
*G06F 3/0487* (2013.01)
*G06F 3/0488* (2013.01)

(52) U.S. Cl.
CPC ......... *G06F 3/04883* (2013.01); *G08C 17/02* (2013.01); *G06F 2200/1637* (2013.01); *G08C 2201/32* (2013.01)

(58) Field of Classification Search
CPC ........ G06F 3/0346; G06F 1/163; G06F 3/016; G06F 3/04883; G06F 3/0488; G06F 3/0482; G06F 3/014; G06F 3/04845; G06F 2203/0381; G06F 2203/0331; G06F 2203/04808; G06F 3/0383; G06F 1/1626; G06F 1/3215; G06F 21/32; G06F 3/0233; G06F 3/038; G06F 3/0416; G06F 3/0481; G06F 3/04817; G06F 3/04842; G06F 3/0487; G06F 9/4443; G06F 3/0484; G06F 3/03; G08C 19/00; G08C 2201/32; G08C 17/02; H04M 1/72522; H04M 2250/12; H04M 2250/22; H04M 19/04; H04M 1/67; H04M 1/72519; H04M 1/72577; H04W 4/00; H04W 52/0254; H04W 52/0264; H04W 52/0274; H04W 88/02; H04W 12/06; H04W 52/027; A63F 13/06; A63F 13/211; A63F 13/213; A63F 13/23; A63F 13/24; A63F 13/30; A63F 13/428; A63F 13/92; A63F 2009/2447; A63F 2300/105; A63F 2300/204; A63F 2300/6045; A63F 9/24; Y02B 60/50

See application file for complete search history.

(56) References Cited

U.S. PATENT DOCUMENTS

| | | |
|---|---|---|
| 2011/0037712 A1* | 2/2011 | Kim .................. H04M 1/7253 345/173 |
| 2011/0199292 A1 | 8/2011 | Kilbride |
| 2012/0007713 A1* | 1/2012 | Nasiri .................. G06F 1/1694 340/5.81 |
| 2012/0025946 A1 | 2/2012 | Chuang et al. |
| 2012/0169482 A1 | 7/2012 | Chen et al. |
| 2012/0225635 A1 | 9/2012 | Esbensen |
| 2013/0044215 A1 | 2/2013 | Rothkopf et al. |
| 2013/0103856 A1 | 4/2013 | Dods et al. |
| 2013/0296048 A1 | 11/2013 | Jeffery et al. |
| 2014/0045463 A1 | 2/2014 | Hsieh et al. |
| 2014/0081179 A1 | 3/2014 | Moore-Ede |
| 2014/0089514 A1 | 3/2014 | Messenger et al. |
| 2015/0145653 A1* | 5/2015 | Katingari ................ G06F 1/163 340/12.3 |
| 2015/0220169 A1* | 8/2015 | Keating .............. G06F 3/03545 345/179 |
| 2016/0209648 A1* | 7/2016 | Haddick ............ G02B 27/0093 |

FOREIGN PATENT DOCUMENTS

| | | |
|---|---|---|
| KR | 10-0793834 B1 | 1/2008 |
| WO | 2011057287 A1 | 5/2011 |
| WO | 2013/026714 A1 | 2/2013 |

OTHER PUBLICATIONS

Communication dated Oct. 9, 2015 issued by the Spanish Patent and Trademark Office in counterpart Spanish Patent Application No. 201430836.

* cited by examiner

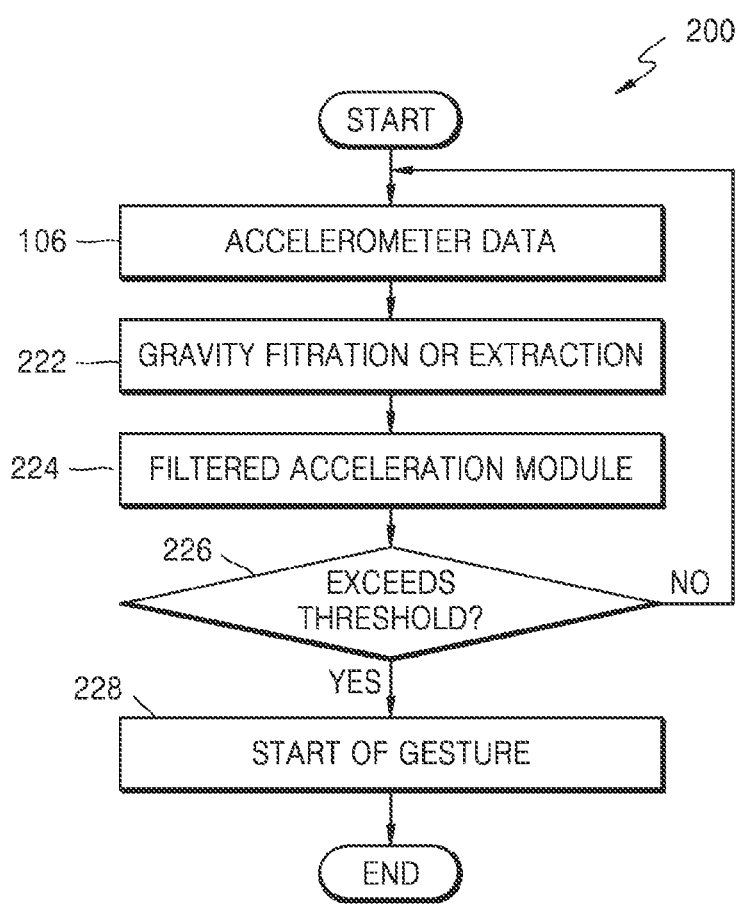

WEARABLE DEVICE AND CONTROL METHOD USING GESTURES

FIELD OF THE INVENTION

The present invention pertains to the field of portable electronic devices (for example, tablets and smartphones) and body-borne computers or wearable devices (otherwise known as "wearables" or "wearable technology"), and especially intelligent electronic devices that are carried by the user on their upper extremities, such as smartwatches, smart rings, smart bracelets or smart gloves. Specifically, the invention relates to a portable device used for remote control via gestures of the portable device itself or of other electronic devices, such as televisions, stereo equipment, smartphones, electronic devices for the car, electronic devices for the home, etc.

BACKGROUND OF THE INVENTION

Currently, portable devices and body-borne or wearable devices are increasingly more widely used. There is a wide range of uses for such devices; thus, for example, Google Glass is used as a display device, while smart clothes are used, above all, to monitor the user's vital signs.

In the field of wearable devices designed for the user's upper extremity, we find smart bracelets and watches for the wrist, smart rings for the finger and smart gloves for the hand, with different applications.

Smart bracelets and watches are used as a small computer with a touchscreen and wireless communication with other devices via Bluetooth, and in many cases, they are provided with GPS and motion detectors (accelerometer, gyroscope and magnetometer).

Among their applications, the display of information from mobile phones is highlighted, and especially user activity monitoring. Thus, the Samsung Gear Fit bracelet monitors the physical activity of the user. The patent document US20140081179-A1 discloses a smartwatch with an accelerometer that registers the movements of the watch to subsequently analyse them and determine whether the user is at risk of fatigue. The document US20140089514-A1 discloses a smartwatch with a motion sensor (accelerometer, gyroscope or magnetometer) to monitor the movement of the user over time. The document US20130044215-A1 discloses the use of inertial sensors (gyroscope or accelerometer) in a smartwatch with a flexible screen to reposition the information shown to the user on the screen depending on the movements of the watch, so that the information from the watch screen is always shown to the user centred regardless of the orientation of the watch.

The application of wearable devices to remotely control external devices is also known. Thus, the Samsung Gear 2 smartwatch is provided with an infrared emitter that may be used as a remote control to control the television.

The patent document CH706077-A2 discloses a smartwatch that controls a hearing apparatus via gestures, for example volume control. However, it has the disadvantage that it can only control a single specific device and that it only recognises basic and robotic movements of the user's hand, and not natural hand movements (for example, lateral hand movement with simultaneous wrist rotation).

There are also smart rings to control a device via gestures. Thus, the Nod smart ring from the company Nod, Inc. enables the index finger to be used as a pointer and includes a small touch-sensitive surface and two function buttons (for example, to turn the volume up and down) that complement the form of interacting with the device. The Smarty Ring smart ring enables control over the user's mobile phone, such as accepting or rejecting calls or activating the phone's camera. The Fin ring from the company RHLvision Technologies uses an optical sensor to carry out the control of a device using the phalanges of the fingers of the hand as a user interface.

With respect to smart gloves, at the 2014 World Mobile Congress held in Barcelona, Fujitsu presented a smart glove with an NFC reader that uses augmented reality (combined with augmented reality glasses) and basic user gesture recognition (up, down, left, right and wrist rotation) to carry out factory maintenance tasks, aiming to reduce workplace accidents and increase the efficiency of maintenance operators.

The use of mobile devices to remotely control other devices via gestures is also known. Thus, the patent document WO2013026714-A1 discloses the use of a mobile phone with a gyroscope to control the engine of a motorised surf board via the movements of the phone. The document US20120225635-A1 discloses the use of a mobile phone to carry out emergency actions when the user shakes the mobile.

In the video games sector the use of motion sensors to control the actions of a video game character on the screen is known. For example, the document US20130296048-A1 discloses the use of a mobile phone as a controller for the movements of the player's golf club, via an accelerometer and gyroscope. The document US20140045463-A1 discloses the use of a smartwatch with an accelerometer, gyroscope and magnetometer for game applications. Similarly, the controller of the Wii console uses an accelerometer to measure acceleration on three axes and determine the movement that the user is carrying out in order to reproduce it on the screen, for example, when applied to a tennis game, the movement of the controller simulates the movement of the racquet that the player carries out in the game.

However, all the portable devices known have the problem that they are specifically made to control a single external device and that said control is carried out in a basic manner with unnatural movements. The present invention solves this problem via a portable device that enables interaction with different external devices (where the selection and/or function of the device that one wishes to control may also be carried out via gestures), with gestures that are completely natural for the user and are independent of the intensity, strength and/or speed of the gesture carried out.

DESCRIPTION OF THE INVENTION

The invention relates to a portable device (i.e. a smart electronic device that is small in size and weight in order to be carried by the user) and a method for the user to control and interact with the electronic devices, either external devices or the portable device itself. In a preferred embodiment, the portable device is a wearable device (also called body-borne computers) that the user carries on a part of their body (legs, arms), preferably on the upper extremity.

The portable device has two function modes: remote and independent. Functioning in the independent mode ("standalone"), the wearable device uses the accelerometer to determine the user's gesture or gestures and locally execute a specific action in the wearable device itself. Functioning in the remote mode, the wearable device recognises the gesture to wirelessly transmit, to an external electronic device, a specific action that said external device must execute.

When it concerns a wearable device, it is preferably put on the user's arm, forearm, wrist or hand (for example, the fingers), in a way that the natural movements of said upper extremity enable interaction with multiple devices and control a number of actions for a same device. There may be many types of wearable device for the upper extremity:

Smartwatches.
Smart rings.
Smart bracelets.
Smart gloves.
Smart T-shirts (or long-sleeved shirts).
Smart jackets.
Smart wristbands.

The portable device may be a non-wearable device, but carried in the user's hand and may be easily handled by the user in the hand. Among others:

Smart pens and pencils.
Pencils for drawing tablets or touch-sensitive surfaces.
Mobile phones.
Tablets.

A first aspect of the invention relates to a portable device with control via gestures, which comprises a control unit and an acceleration measurement module on at least three different axes, the control unit being configured to identify, using the acceleration data from the acceleration measurement module, a command gesture carried out by the user carrying the portable device and obtain, from said command gesture, an order to control the device. The control unit is additionally configured to detect a trigger signal executed by the user prior to the command gesture being carried out and, from said detection, start identification of the command gesture.

The trigger signal, preferably a gesture, may include additional information, and in particular:

device selection information that serves the control unit in order to determine the device to which the order is directed; and/or
device function information that serves the control unit in order to determine the function of the device to which the order is directed.

When the trigger signal includes additional information, the control unit may be configured to obtain the order from the command gesture and said additional information included in the trigger signal.

In a preferred embodiment, the portable device comprises a wireless communication module and the control unit is configured to wirelessly send the order to an external device for it to be executed in said external device.

In another preferred embodiment, the control unit is configured to execute the order in the portable device itself, rather than being executed in an external device.

The portable device is preferably a wearable device, to be placed on the user's upper extremity.

The portable device is preferably carried on one of the user's extremities. To identify a gesture, the control unit may be configured to carry out a rotation correction to separate the movement of the portable device with the rotation of the user's extremity on its axis. In a preferred embodiment, the rotation correction comprises obtaining the initial angle θ of rotation of the extremity on its axis and rotating the acceleration data by said angle θ using a rotation matrix. The portable device may also comprise a gyroscope, such that the control unit is configured to carry out the rotation correction using data from the gyroscope.

To identify a gesture, the control unit may be configured to carry out a standardisation of the acceleration data received to separate the strength of the gesture, where said standardisation is carried out whilst the gesture is being executed using the average and standard deviation of the acceleration data accumulated at any given moment.

The control unit may be configured to check, whilst the gesture is carried out or at the end of the same, the validity of the gesture, including at least the following checks:

saturation of the acceleration measurement module;
if the gesture is too long, when the duration of the gesture in time or number of samples exceeds a certain threshold;
if the gesture is too short, when the duration of the gesture in time or number of samples is below a certain threshold;

The control unit may be configured to detect the start of the gesture via gravity filtration being carried out on the acceleration data received, when the module of said filtered acceleration exceeds a certain threshold.

The control unit may be configured to detect the end of the gesture via gravity filtration being carried out on the acceleration data received and when the module of said filtered acceleration does not exceed a certain threshold during a certain number of consecutive samples.

In a preferred embodiment, the control unit is configured to identify the gesture using reference data obtained in a previous training phase.

The portable device comprises a magnetometer, in such a way that the trigger signal for device selection is carried out using said magnetometer.

A second aspect of the present invention relates to a control method of a device via gestures, wherein control is carried out via a portable device with an acceleration measurement module on at least three different axes. The method comprises:

identifying a command gesture carried out by a user that carries the portable device using the acceleration data from the acceleration measurement module, and
obtaining, from said command gesture, an order to control a device;
detecting a trigger signal executed by the user prior to the command signal being carried out and, from said detection, starting identification of the command gesture.

In a preferred embodiment, the method comprises wirelessly sending the order to an external device for it to be executed in said external device. The order may alternatively be executed in the portable device itself.

The gesture identification phase may comprise carrying out a rotation correction to separate the movement of the portable device with the rotation of the user's extremity on its axis. Said rotation correction may comprise obtaining the initial rotation angle θ of the extremity on its axis and rotating the acceleration data by said angle θ using a rotation matrix.

The gesture identification phase may comprise standardising the acceleration data received to separate the strength of the gesture, where said standardisation is carried out while the gesture is executed using the average and standard deviation of the acceleration data accumulated at any given moment.

The method may comprise checking, whilst the gesture is being carried out or at the end of the same, the validity of the gesture.

The method may comprise detecting the start of the gesture via a gravity filtration being carried out on the acceleration data received and when the module of said filtered acceleration exceeds a certain threshold.

The method may comprise detecting the end of the gesture via a gravity filtration being carried out on the acceleration data received and when the module of said filtered acceleration does not exceed a certain threshold during the certain number of consecutive samples.

The method may comprise identifying the gesture using reference data obtained in a previous training phase.

According to an aspect of an exemplary embodiment, a portable device includes: a sensor configured to detect a gesture of a user carrying the portable device; a control unit configured to identify the detected gesture, determine an external device corresponding to the identified gesture based on the identified gesture, and determine an order for controlling the external device; and a communication unit configured to transmit a command signal corresponding to the order to the external device.

The sensor may bean acceleration measurement module configured to measure acceleration, wherein acceleration data of the gesture may be obtained using the acceleration measurement module, and the gesture may be identified using the acceleration data.

The user may wear the portable device on his/her arm, and the control unit may perform a rotation correction to separate a rotation of the user's arm from a movement of the portable device.

The rotation correction may include obtaining an initial angle of rotation of the arm on an axis of the portable device and rotating the acceleration data according to the initial angle using a rotation matrix.

The sensor may include a gyroscope, and the control unit may perform the rotation correction using data obtained from the gyroscope.

The control unit may check validity of the gesture based on one or more of whether the acceleration measurement module is saturated, whether duration of the gesture exceeds a first threshold, and whether the duration of the gesture is shorter than a second threshold.

The portable device itself may control the external device according to the order determined by the control unit.

The portable device may be a wearable device.

The control unit may standardize the acceleration data to separate strength of the gesture, and standardisation of the acceleration data may be performed using an average and a standard deviation of the acceleration data while the gesture is being made.

The control unit may determine the external device corresponding to the gesture by comparing the identified gesture with previously stored reference data, and may select a first order corresponding to the gesture from a plurality of orders for controlling the external device.

The sensor may include a magnetometer, and the control unit may identify the gesture based on data obtained using the magnetometer.

According to an aspect of an exemplary embodiment, a method of operating a portable device includes: detecting a gesture of a user carrying a portable device; identifying the detected gesture; determining an external device corresponding to the identified gesture based on the identified gesture, and an order for controlling the external device; and transmitting a command signal corresponding to the order to the external device.

The portable device include an acceleration measurement module configured to measure acceleration, and the identifying of the detected gesture includes obtaining acceleration data of the gesture from the acceleration measurement module and identifying the gesture using the acceleration data.

The user may wear the portable device on his/her arm, and the method may further include performing a rotation correction so as to separate a rotation of the user's arm from a movement of the portable device.

The rotation correction may include obtaining an initial angle of rotation of the arm on an axis of the portable device and rotating the acceleration data according to the initial angle using a rotation matrix.

The portable device may further include a gyroscope, and the rotation correction may be performed using data obtained from the gyroscope.

The identifying of the detected gesture may further include checking validity of the gesture based on one or more of whether the acceleration measurement module is saturated, whether duration of the gesture exceeds a first threshold, and whether the duration of the gesture is shorter than a second threshold.

The method may further include controlling the external device using the portable device itself according to the order.

The method may further include standardizing the acceleration data to separate strength of the gesture, wherein standardisation of the acceleration data may be performed using an average and a standard deviation of the acceleration data while the gesture is being made.

The determining of the external device and the order for controlling the external device may include comparing the identified gesture with previously stored reference data, determining the external device corresponding to the gesture based on results of the comparison, and selecting a first order corresponding the gesture from a plurality of orders for controlling the external device.

BRIEF DESCRIPTION OF THE DRAWINGS

A series of drawings that aid in better understanding the invention and that are expressly related to an embodiment of said invention that is presented as a non-limiting example are briefly described below.

FIG. 7 shows the detection phase of the start of the gesture.

DETAILED DESCRIPTION OF THE INVENTION

Figure 1:
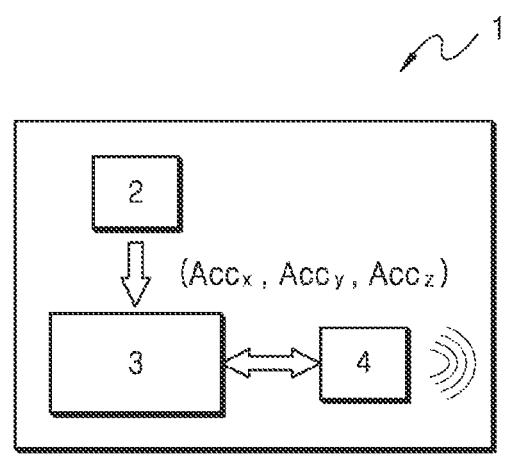
FIG. 1 schematically shows of the hardware components of the portable device of the present invention.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

The terms used in the following description are selected from general terms currently widely used in the art in consideration of functions in regard to the exemplary embodiments, but the terms may vary according to the intention of those of ordinary skill in the art, precedents, or new technology in the art. Also, in some cases, the applicant may voluntarily select some terms, and in this case, the detailed meanings thereof will be described in the relevant sections. Thus, the terms used in the following description should be understood not as simple names but based on the meanings of the terms and the overall descriptions of the exemplary embodiments.

It will be further understood that the terms "comprise" "include," and/or "have" used herein specify the presence of stated features or elements, but do not preclude the presence or addition of one or more other features or elements unless otherwise specified. In addition, the term "unit" used herein refers to a software element or a hardware element having a certain function such as a field programmable gate array (FPGA) or an application specific integrated circuit (ASIC). However, the term "unit" is not limited to software or hardware. A unit may be embodied to be included in an addressable storage medium or to reproduce one or more processors. Therefore, for example, a unit may include: elements such as software elements, object-oriented software elements, class elements, and task elements; processes; functions; properties; procedures; sub-routines; segments of a program code; drivers; firmware; microcode; circuit; data; database; data structures; tables; arrays; and variables. Functions of elements and units may be included in fewer elements and units or in additional elements and units.

Although terms such as "first" and "second" may be used herein to describe various elements or components, these elements or components should not be limited by these terms. These terms are only used to distinguish one element or component from another element or component. For example, a first element may be termed a second element, and, similarly, a second element may be termed a first element, without departing from the scope of the inventive concept. As used herein, the term "and/or" includes any and all combinations of one or more of the associated listed items.

It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

Hereinafter, exemplary embodiments will be described in detail with reference to the accompanying drawings so that they may be apparent to those of ordinary skill in the art. However, the inventive concept may be embodied in various forms and is not limited the exemplary embodiments.

FIG. 1 schematically shows of some of the hardware components of the portable device 1 of the present invention. The portable device 1 incorporates:

An acceleration measurement module 2, in charge of obtaining the acceleration on at least three different axes. In one particular embodiment a single three-axes accelerometer is used, although accelerometers for more axes (6 axes, 9 axes, etc.) may be used, or even combinations of one- or two-axis accelerometers (for example, three or more single-axis accelerometers for each; or a one-axis accelerometer and another two-axes accelerometer). The acceleration on three axes is represented in the figure as ($Acc_x$, $Acc_y$, $Acc_z$).

A control unit 3 (with data processing means such as a processor, a microcontroller, etc.).

A wireless communication module 4 (for example, a Bluetooth transceiver, and/or a Wi-Fi transceiver, and/or a light transceiver—visible light communication (VLC)—) to communicate with external devices (television, stereo equipment, air conditioning, smartphone, etc.). In a preferred embodiment, the portable device is a wearable device, such as a smartwatch, for example.

The portable device 1 may include a sensor (not shown), the control unit 3, and a communication unit (not shown). The sensor (not shown) detects gestures of a user carrying the portable device 1. In detail, the sensor (not shown) may be an acceleration measurement module configured to measure acceleration. The acceleration measurement module may measure acceleration data of a gesture and may identify the gesture using the acceleration data.

For example, a user may wear the portable device 1 on his/her arm. For example, a user may wear a smartwatch on his/her wrist, and a gesture of the user may be detected using the movement of the smartwatch worn around the wrist.

The control unit 3 may identify the detected gesture and determine an external device corresponding to the identified gesture based on the identified gesture. That is, a user wearing the portable device 1 may control a first external device among a plurality of external devices by using the portable device 1. If a user wearing the portable device 1 makes a gesture, the sensor (not shown) may detect the gesture, and the control unit 3 may identify the detected gesture and determine an external device corresponding to the identified gesture.

The control unit 3 may determine an external device corresponding to the identified gesture by comparing the identified gesture with previously stored reference data, and may select a first order corresponding to the identified gesture from a plurality of orders for controlling the external device.

The control unit 3 may determine an order for controlling the external device based on the identified gesture. In detail, if a user wears the portable device 1 on his/her arm and the user makes a gesture, the control unit 3 may perform a rotation correction to separate a rotation of the user's arm from a movement of the portable device 1 and to thus identify the gesture of the user more correctly. Here, those of ordinary skill in the art may understand that other methods may be used to identify the gesture of the user more correctly. The rotation correction may include obtaining an initial angle of rotation of the user's arm on an axis of the portable device 1 and rotating the acceleration data according to the initial angle using a rotation matrix.

The sensor (not shown) may include a gyroscope, and the control unit 3 may perform the rotation correction using data obtained via the gyroscope.

In addition, the sensor (not shown) may further include a magnetometer, and the control unit 3 may identify the gesture based on data obtained via the magnetometer.

The control unit 3 may check the validity of the gesture of the user. The control unit may check the validity of the gesture based on one or more of whether the acceleration measurement module is saturated, whether the duration of the gesture exceeds a first threshold, and whether the duration of the gesture is shorter than a second threshold.

In detail, if the acceleration measurement module is saturated, the control unit 3 may determine the gesture of the user as being not valid. In addition, if the duration of the gesture exceeds the first threshold, the control unit 3 may determine that the gesture is not valid.

The control unit 3 may standardize acceleration data measured using the sensor (not shown) so as to separate the strength of the gesture of the user and identify the gesture more correctly. The standardisation of acceleration data may be performed based on the average and standard deviation of the acceleration data while the gesture is being made. This will be described in more detail.

The control unit 3 is a hardware unit including at least one processor such as a central processing unit (CPU) or an application processor (AP). The function of the control unit 3 is to control the overall operation of the portable device 1. External devices mentioned herein may be devices capable of receiving orders from the portable device 1 and perform operations corresponding to the orders. Examples of the external devices include home appliances such as televisions, washing machines, cleaners, radios, stereos, and computers. However, the external devices are not limited thereto.

The communication unit (not shown) transmits a command signal corresponding to an order to an external device. The communication unit (not shown) may communicate with an external device through a network in a state in which the communication unit is combined with hardware. In detail, the communication unit (not shown) may transmit a command signal to an external device through a wireless network. Examples of the wireless network include wireless LAN, WiFi, Bluetooth, Zigbee, Wi-Fi direct (WFD), ultra wideband (UWB), infrared data association (IrDA), Bluetooth low energy (BLE), and near field communication (NFC). However, the communication unit is not limited thereto.

The portable device 1 may transmit a command signal corresponding to an order for controlling an external device, and the external device may receive the command signal and perform an operation corresponding to the order. In addition, the portable device 1 itself may directly control an external device to operate the external device.

The portable device 1 may include a CPU so as to control overall operations of the sensor (not shown), the control unit 3, and the communication unit (not shown). The CPU may be embodied as an array of a plurality of logic gates or as a combination of a microprocessor and a memory storing a program executable on the microprocessor. Those of ordinary skill in the art will understand that the communication unit may be configured by any other hardware.

In the following descriptions of various operations and applications of the portable device 1, operations or applications apparent to those of ordinary skill in the art should be understood as being performed or achieved by general methods even though the sensor (not shown), the control unit 3, and the communication unit (not shown) are not specified for such operations or applications. The scope of the inventive concept is not limited by a particular element name or physical/logical structure.

Figure 2:
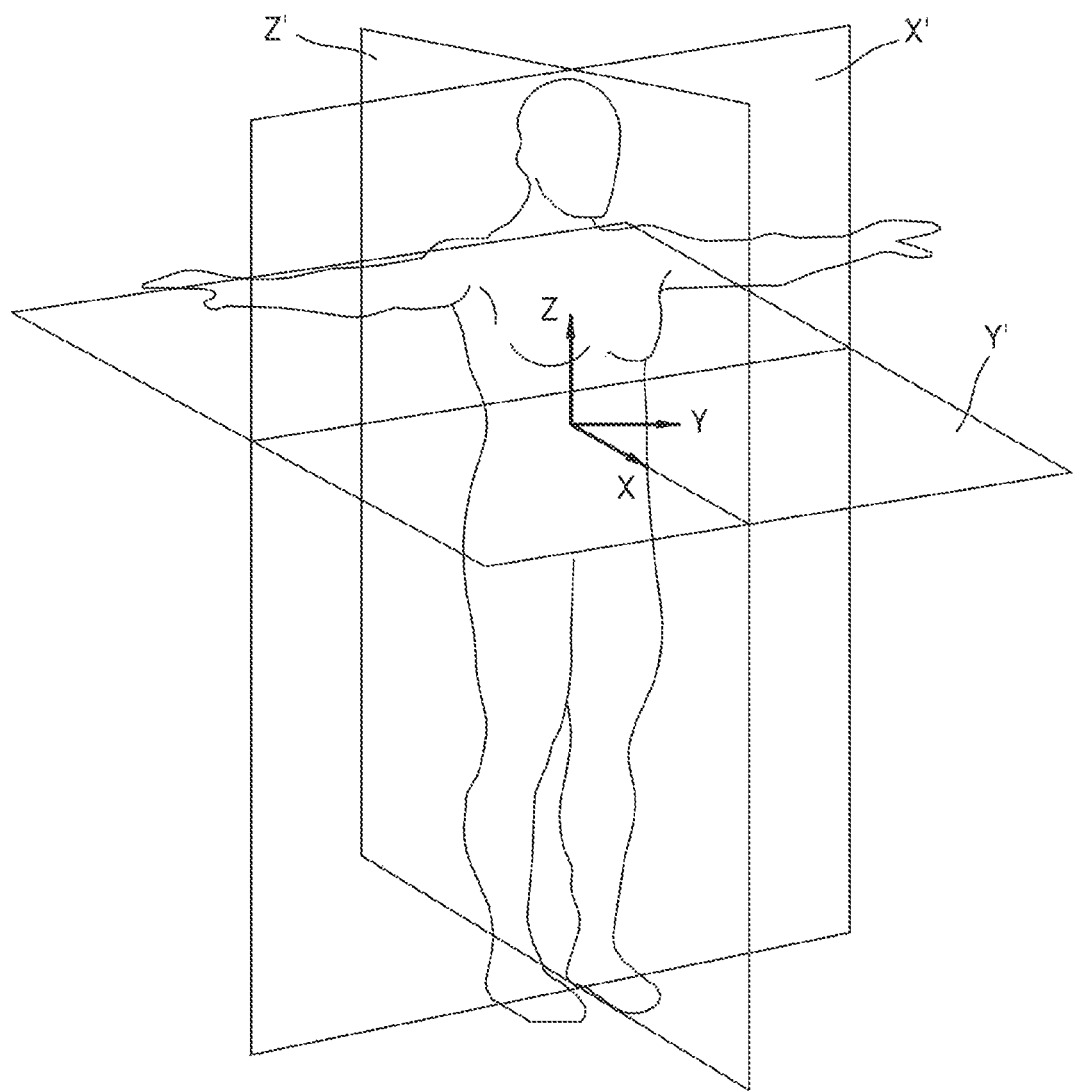
FIG. 2 shows the anatomical planes X', Y', Z'.

FIG. 2 shows the anatomical planes: vertical plane Z' of symmetry, horizontal plane Y' and plane X' which is perpendicular to both. The purpose of using an acceleration measurement module 2 that obtains the acceleration on at least three different axes is to obtain the vector of acceleration ($Acc_x$, $Acc_y$, $Acc_z$) in space, on the three coordinated axes X, Y, Z. For this purpose, a three-axis accelerometer may be used, for example. Henceforth, and for simplicity, the acceleration measurement module 2 shall be referred to as accelerometer.

Any translational movement of a body on the surface of the earth is the result of the force of gravity being applied, along with other forces such as those that may be applied by a user on the body or device. The accelerometer enables the magnitude of the sum of these forces to be obtained as accelerations on three axes relative to the reference system thereof, regardless of the position of the device, as well as the orientation with regard to the horizontal plane of the ground at rest, since in this position the direction of the acceleration vector produced by the Earth's gravitational force is shown. Ideally, the data obtained does not vary regardless of the location of the sensor on any point of the Earth's surface, so the accelerometer enables a relative translational movement of a body or device to be sufficiently characterised in order to differentiate it from another.

Figure 3:
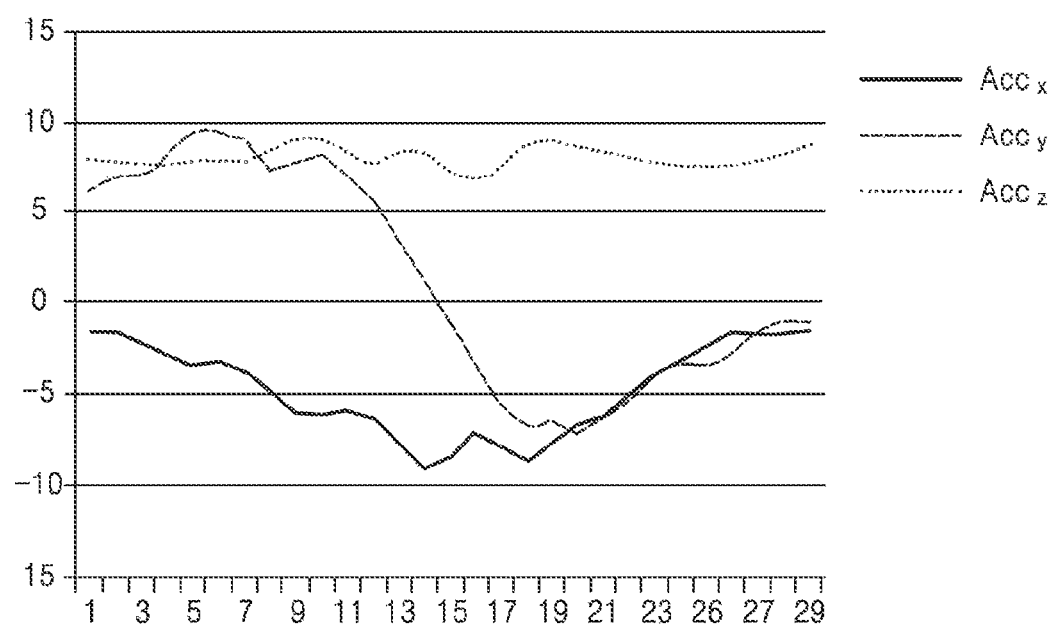
FIG. 3 shows an example accelerometer reading on its three axes when it is subjected to a certain acceleration.

The accelerometer 2 measures the acceleration applied on the portable device 1 on three axes (X, Y, Z), including the force of gravity. Depending on the orientation in the space of the accelerometer, the three axes of the accelerometer may or may not actually coincide with the axes X, Y, Z represented in FIG. 2. FIG. 3 shows an example accelerometer reading on its three axes (X, Y, Z) when it is subject to a certain acceleration (for example, a gesture by the user when they move the upper extremity where the portable device is placed).

Figure 4:
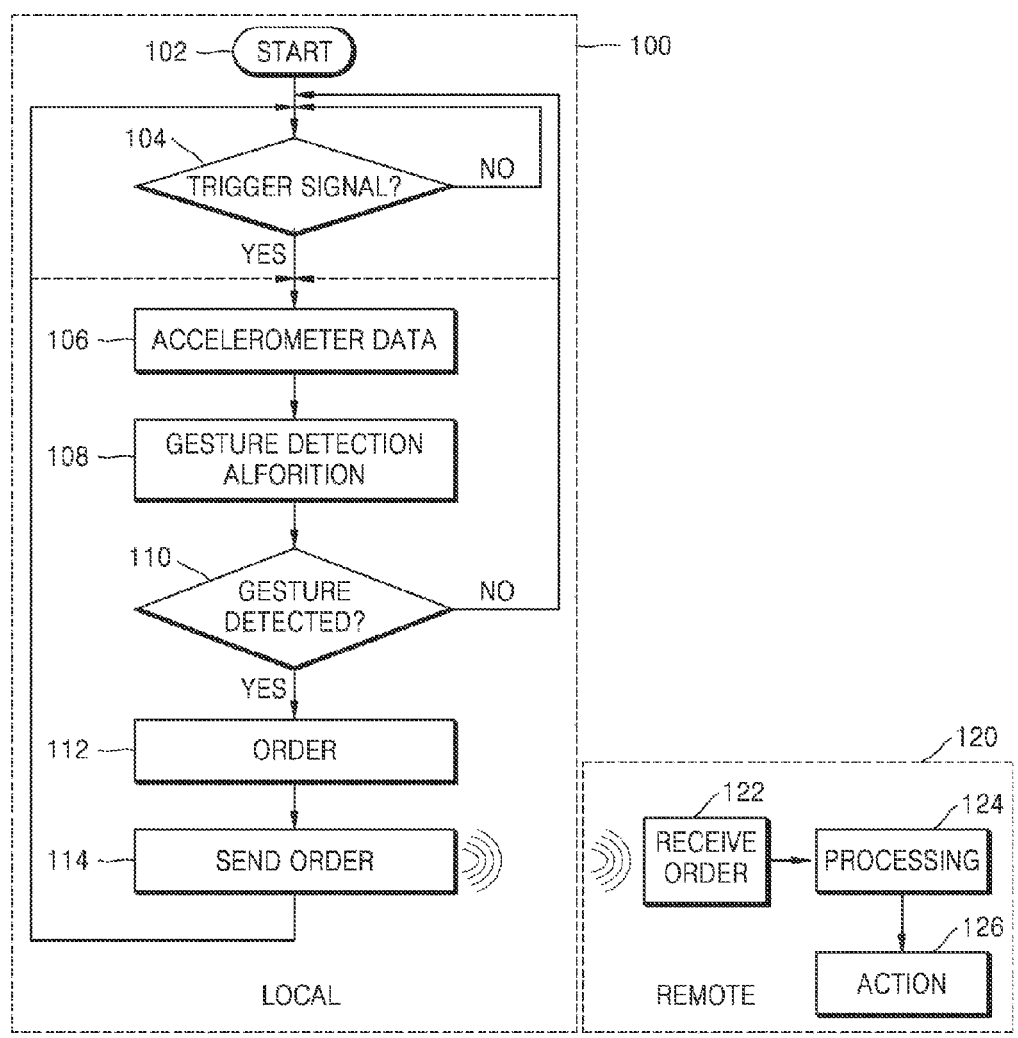
FIG. 4 shows a general diagram of the algorithm implemented in the portable device.

FIG. 4 shows a general diagram of the algorithm implemented in the portable device 1, carried by the user on one of their upper extremities, either the arm, forearm, wrist or hand.

According to what is shown in FIG. 4, the user uses the portable device 1 to wirelessly send a command signal (i.e. an order) via gestures to an external device. In another preferred embodiment, the order may be executed in the portable device itself, rather than being sent to an external device.

Before carrying out a gesture that corresponds to a certain order (for example, moving the smartwatch upwards to send an order to turn up the volume), the user executes a trigger signal, or activation signal, so that the gesture order recognition starts. The trigger signal may be, for example, a touch or tap on the touchscreen of the smartwatch, or even a characteristic gesture. The trigger signals shall be explained in more detail below.

The box on the left schematically shows an exemplary embodiment of local processing 100 of the portable device 1. In detail, the portable device 1 (such as a smartwatch or smart ring) may perform the local processing 100. The box on the right schematically shows remote processing 120 that is performed in an external device controlled by an order from the portable device 1. In detail, the portable device 1 controls the external device.

In the local processing 100, the existence of a trigger signal is checked after a first start phase 102. The portable device 1 detects a trigger signal (phase 104). If a trigger signal is detected, accelerometer data is read (phase 106). The portable device 1 interprets the acceleration data using a gesture detection algorithm (phase 108). The portable device 1 uses accelerometer readings so as to determine whether a gesture is detected (phase 110). The portable device 1 obtains an order based on a detected gesture (phase 112). The portable device 1 transmits a signal corresponding to the order to the external device.

The portable device 1 may identify the detected gesture and may determine a command or order corresponding to the identified gesture for controlling the external device. The portable device 1 may transmit the determined order to the external device through a network such as a wireless network (phase 114).

The portable device 1 may determine the command or order by a method such as a method of consulting tables stored in a database in which gestures corresponding to orders are stored by using a client application running on the portable device 1. Wireless communication refers to transmission of the command or order (refer to phase 114) to the external device by a wireless communication method (such as low-energy Bluetooth).

The external device receives the command or order through the network (for example, using a wireless communication unit or method) (phase 122). The external device processes the received order (phase 124). In phase 124, processing refers to analyzing the received order for executing the order using the external device. The external device executes an action corresponding to the order (such as lowering the volume, turning-off, or heating) (phase 126). In turn, the external device may send an acknowledgment of receipt of the order received (not shown in FIG. 4), which may have additional information linked to it. Thus, for example, if the portable device 1 receives an acknowledgement of receipt, it may vibrate via an incorporated vibrator so that the user knows that the order was received and executed effectively. In addition, the portable device 1 may show information received on its screen with the acknowledgement of receipt, for example ("volume increased"), so that the user knows the specific action that has been executed. The acknowledgement of receipt signal (from the external device or the portable device 1 itself) may generate vibrations in the portable device 1, music/sounds, changes in lighting or colour on the screen, illumination of light sources external to the screen (for example, LEDs in the sides of the portable device 1), text messages, showing images on the screen, showing text and images, animation, videos, etc.

So that the external device may communicate with the portable device, the external device must have a wireless communications module that is compatible with the portable device 1 (Wi-Fi, Wi-Fi Direct, Bluetooth, Bluetooth LE, infrareds, visible light communication), as well as a processing unit to be able to receive the order, process and execute it. In order to communicate between each other, devices must be paired, either through an application (especially if they are devices of the same brand) or using the Bluetooth profile, for example.

In the local processing 100, once the order 114 has been sent or when the gesture 110 has not been detected, it is possible to once again wait for a trigger signal 104 to start the gesture detection algorithm 108. Another variation, marked with dashed lines, is that a new trigger signal 104 is not waited for, but rather the gesture detection algorithm 108 is executed again. This may be provided for certain types of trigger signals, in those where a consecutive series of orders is given and, therefore, it is not necessary to repeat the trigger for every order. For example, this would be useful to control images shown on a television (the external device), in such a way that a trigger indicates that numerous series of orders are going to be given regarding image change, until a new trigger signal is received that indicates the end of the image change control or when an established period of time has passed since the trigger signal was activated. Therefore, it would also be useful when a trigger signal allows for an undetermined number of orders to be executed during an established period of time, in such a way that the trigger signal activates a timer and the user may execute a number of orders until the timer runs out without the need to reactivate the trigger between consecutive orders. Once the timer has run out, however, the user must then reactivate the trigger signal in order to execute orders. The trigger signal shall be explained in more detail below.

Figure 5:
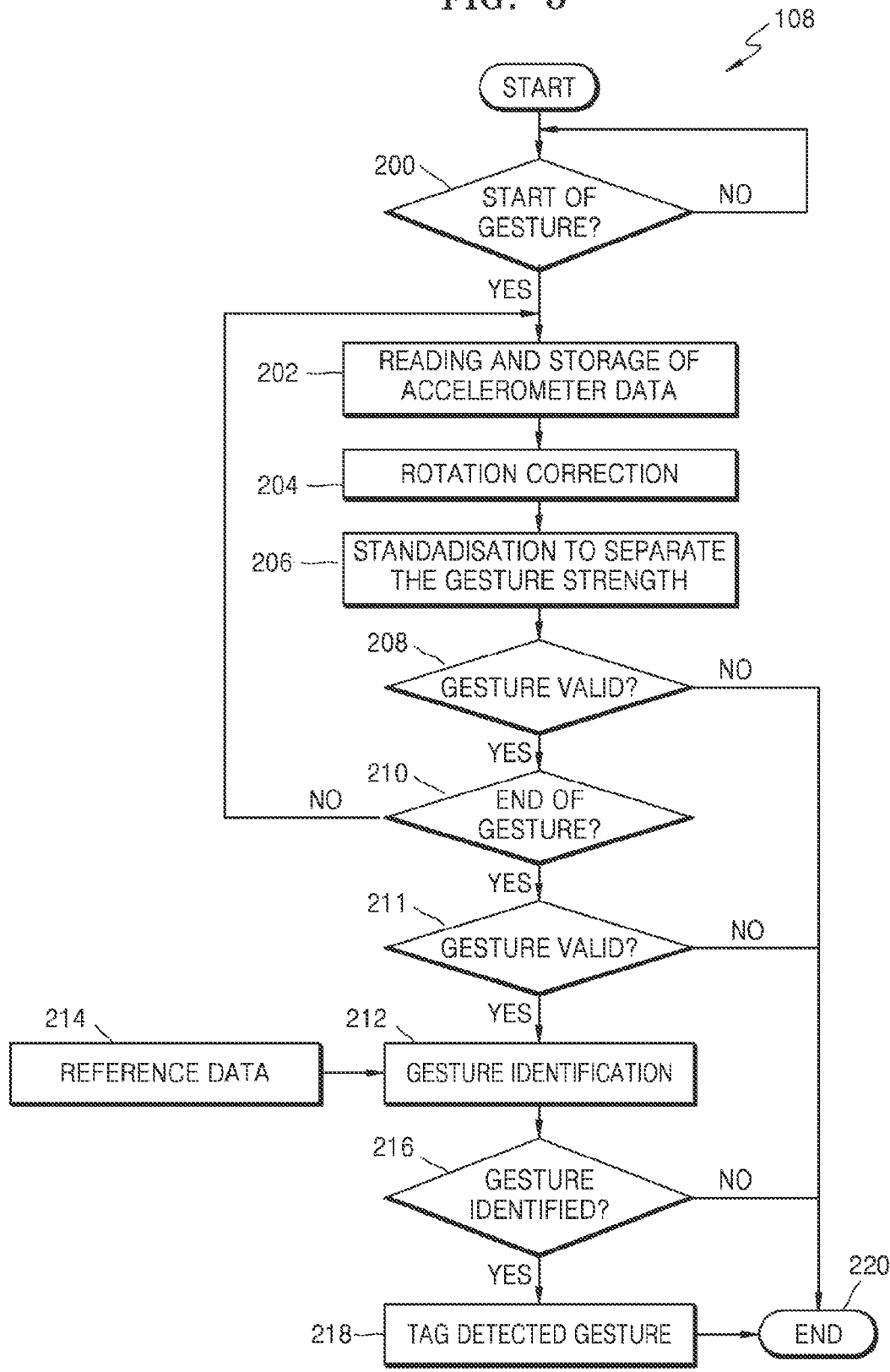
FIG. 5 shows a diagram of the gesture detection algorithm implemented in the portable device.

FIG. 5 is a diagram illustrating the gesture detection algorithm 108 used by the portable device 1. The gesture detection algorithm 109 of the portable device 1 starts with detecting the start of a gesture (phase 200). Once the start of a gesture is detected, the portable device 1 reads and stores acceleration data from the accelerometer (phase 202) (for example, if the portable device 1 is a smartwatch or smart bracelet, the portable device 1 is rotated by the wrist). The portable device 1 performs a rotation correction to separate a rotation of an upper extremity of the user from a movement of the portable device 1 (on three axes X, Y, and Z) (phase 204). This enables the user to carry out natural movements (rather than robotic movements) to make gestures. A lateral movement to the left includes a natural hand or wrist rotation (opening the hand if the gesture is carried out with the portable device 1 being worn on the left upper extremity of the user). The gesture detection algorithm 108 continues to detect the gesture (lateral movement to the left) regardless of the wrist rotation carried out.

The portable device 1 performs standardisation to separate the strength of the gesture (phase 206). The purpose of standardisation is to recognize the gesture regardless of the intensity, strength, and/or speed of the gesture. Thus, a lateral movement to the left may be recognized regardless of whether it is carried out slowly or quickly by the user. Since acceleration means are very different in both cases, it may be important to recognize a movement regardless of whether the movement is slow or quick.

While the gesture is carried out, the validity of the gesture may be checked because incorrect accelerometer reading or accelerometer saturation may occur (phase 208). Incorrect accelerometer reading or accelerometer saturation may make it impossible to detect the gesture or terminate detection process. If the gesture is determined as being valid while the validity of the gesture is checked, it is determined whether the gesture stops (phase 210). If it is determined that the gesture does not stop, acceleration data reading phases 202 to 210 are repeated.

If end of the gesture is detected (phase 210), the validity of the gesture is checked again (phase 211). If the gesture is determined as being valid and ended, calculation is performed to identify the gesture (phase 212). To this end, a series of reference data is used (phase 214). The reference data is previous obtained through a template generation process. The template generation process will be described later in detail. If the gesture made by the user is not identified after comparing the gesture with the reference data, the gesture detection algorithm 108 is terminated. On the contrary, if the gesture is correctly identified (phase 216), a tag of the gesture is obtained (phase 218).

Figure 6:
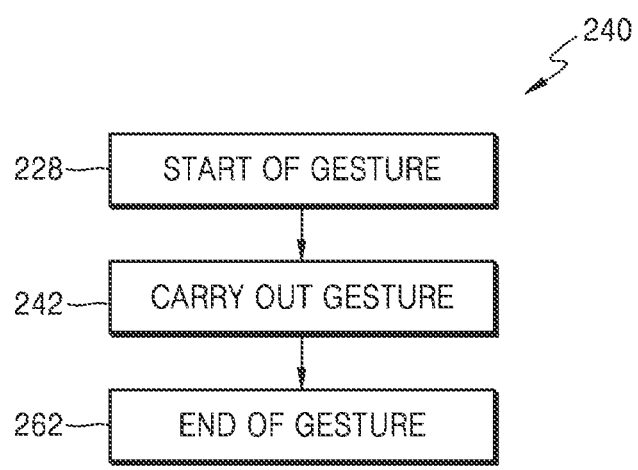
FIG. 6 shows the segmentation of a gesture.

To detect the gestures, it must be taken into account that the application programming interface (API) of the accelerometer supplies a continuous sequence of accelerometer data, whilst the gesture detection algorithm 108 works with a finite number of samples of the accelerometer, for which reason it is necessary to segment the data from the accelerometer 2 in order to single out only the portion of data supplied whilst the gesture is carried out. That is to say, the accelerometer samples produced during the duration of the user's gesture must be identified and separated. A gesture may be defined in three phases, as shown in FIG. 6, which shows the segmentation of a gesture 240:

Start of the gesture 228.
Carrying out the gesture 242.
End of the gesture 262.

The start of the gesture 228 is determined in the start of gesture detection phase 200, shown in detail in FIG. 7.

The portable device 1 may read and store acceleration data (phase 106). The portable device 1 may perform a rotation correction (phase 222). The portable device 1 performs standardisation to separate the length of a gesture (phase 224). If a detected gesture is valid (phase 226), the portable device 1 may determine it as the start of the gesture (phase 228).

Figure 8A:
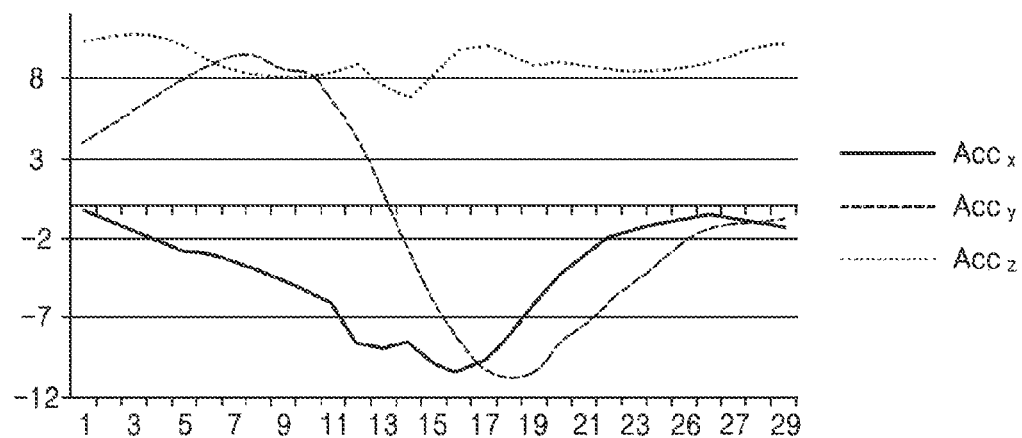
FIG. 8A shows accelerometer data with the effect of gravity (Z axis) and FIG. 8B shows the same data but filtered on the three axes.
Figure 8B:
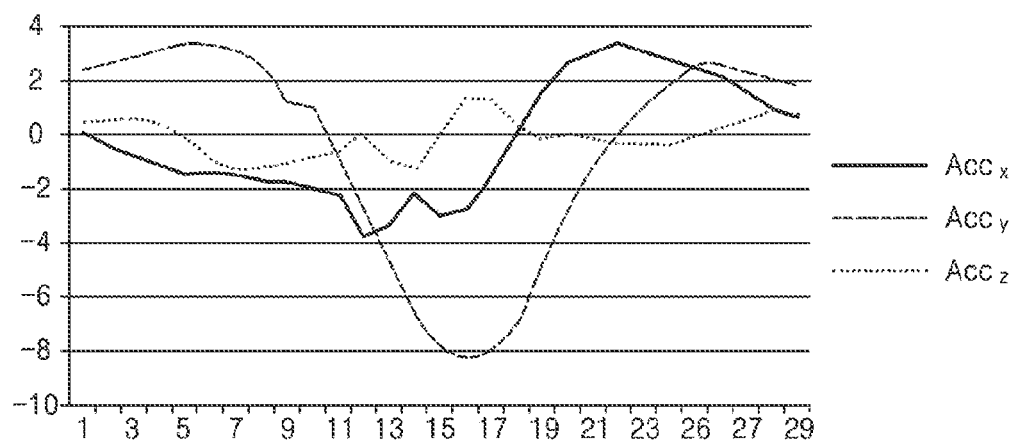

The gesture detection algorithm 108 continually receives the accelerometer data 106. Then, gravity filtration or extraction 222 is carried out on the acceleration data provided by the accelerometer 2. To analyse acceleration, the force of gravity continually acting on vertical axis Z must be taken into account (taking the Earth's surface as an absolute reference). As the magnitude of the force of gravity may be considered constant over time, a high-pass filter (for example, $1^{st}$ Order Fc=2 Hz) to filter gravity may be used. However, given that the accelerometer has a reference system that is integral to the device and that the latter may move freely, the acceleration appears disorganised on the three reference axes of the accelerometer depending on the position of the device with respect to Earth. Therefore, the filter must be applied to the three axes of the accelerometer. FIG. 8A shows data from the accelerometer with the effect of gravity (axis Z). As for FIG. 8B, it shows the previous filtered data on axis Z, but as a side effect, part of the acceleration values on the axes X and Y have also been filtered and the values thereof differ from the original values.

The filtered acceleration module 224 is subsequently calculated, according to the following formula:

$$\sqrt{(Acc_x^2 + Acc_y^2 + Acc_z^2)} \qquad (1)$$

where ($Acc_x$, $Acc_y$, $Acc_z$) represents the acceleration components after extracting or filtering gravity in the previous step.

When the user starts to carry out a gesture, it has been empirically shown that using the acceleration module on three axes supplied by the accelerometer, it may be identified when a possible gesture is starting to be executed. It is for this reason that it is checked 226 whether the value of the filtered acceleration module, according to equation (1), is greater than a certain threshold, in which case it is determined that there is a potential start of gesture 228. Thus ends 230 the detection phase of the start of a gesture 200, and the gesture detection algorithm 108 moves to the next phase (phase 202) to identify the gesture that has just been started. In the event that it does not exceed the established threshold, the start of gesture check is restarted.

During the phase of carrying out the gesture 242, the user is carrying out the gesture and the acceleration values remain above a threshold. Whilst carrying out the gesture 242, the gesture detection algorithm 108 reads and stores the data received from the accelerometer 202, and carries out rotation correction 204, standardisation 206 and gesture validity check 208.

Figure 9:
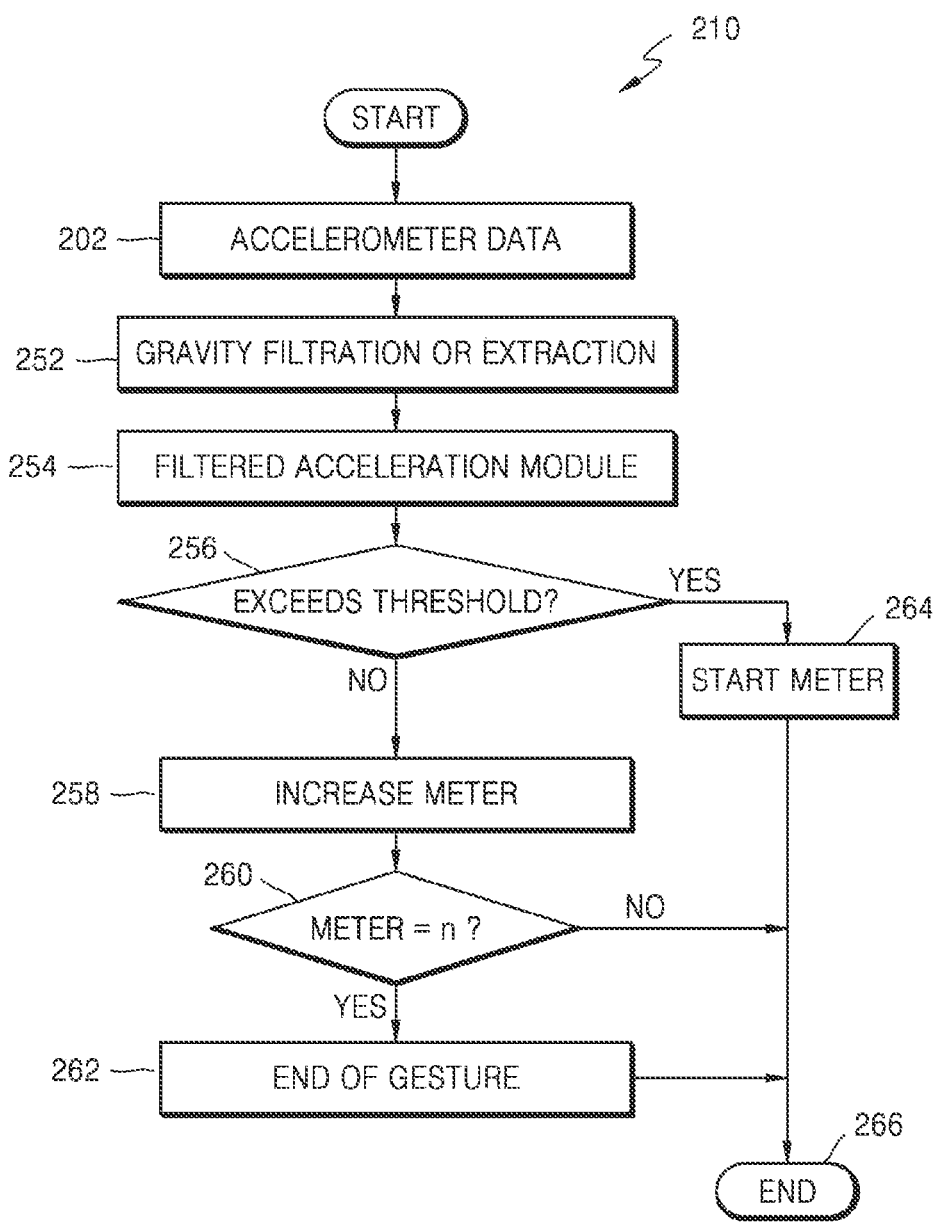
FIG. 9 shows the detection phase of the end of the gesture.

The end of the gesture 262 is determined in the end of gesture detection phase 210, shown in detail in FIG. 9. Said phase starts by receiving the accelerometer data previously read and stored in phase 202. Then, the gravity filtering and extraction 252 is carried out on said acceleration data, the filtered acceleration module 254 is calculated and it is determined whether it exceeds a threshold 256, similarly to how start of gesture detection phase 200 was carried out.

It has been empirically shown that the user ends the gesture when a determined number of accelerometer samples are below a threshold, which is normally the same threshold considered in order to determine the start of the gesture. In a preferred embodiment, the gesture is identified as having ended if there is a certain number n of consecutive values (12 values, in the embodiment considered) supplied by the accelerometer whose module does not exceed the threshold, although said number may vary and can be configured. Thus, when the threshold is exceeded in the end of gesture detection phase 210, a meter 258 is increased by one (the meter previously started at zero when the start of the gesture is detected). It is checked 260 whether the meter reaches a certain number n, in which case it is considered as the end of the gesture 262 and, if the opposite is true, then the phase 266 ends until the next acceleration data is received (this phase 210 is called again for the next acceleration data in the gesture detection phase 108). If the threshold is exceeded, the meter 264 is started, since the values detected below the threshold must be consecutive in order to determine the end of the gesture 262.

It must be noted that the filtered acceleration values are used to determine if the module value is higher than the threshold to determine the start and the end of the gesture, since it has been proven that more reliable results are obtained with said filtered values. However, these filtered values are only used to very reliably determine the start of the gesture 228 and the end of the gesture 262, but the gesture detection algorithm does not use these filtered values while the gesture is being carried out 242 to determine the gesture that has been carried out, since the use of unfiltered values is much more precise and uniform for the same gesture carried out by different users, which means that these unfiltered values are better for singling out the specific gesture executed by the user.

Figure 10A:
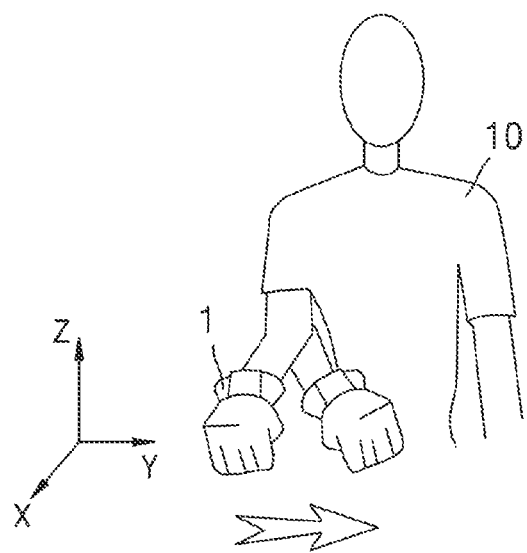
FIGS. 10A to 10G show images and graphs where the differences between robotic hand gestures and natural hand gestures with wrist rotation.
Figure 10B:
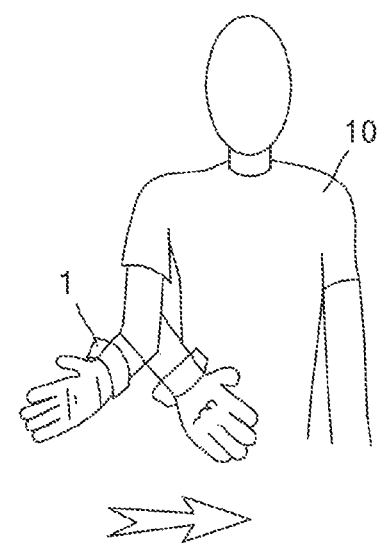
Figure 10C:
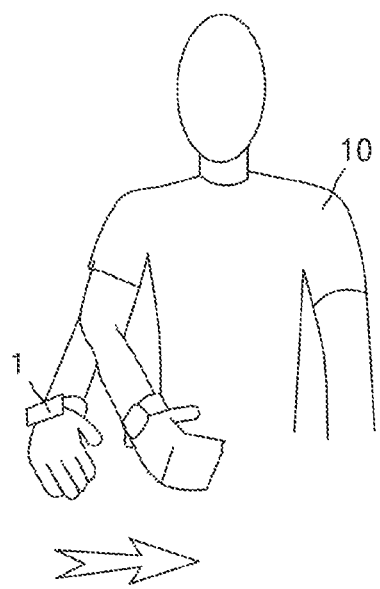
Figure 10D:
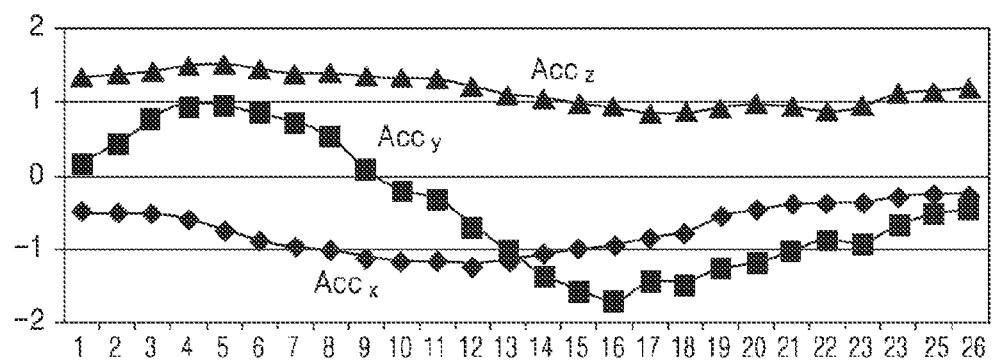
Figure 10E:
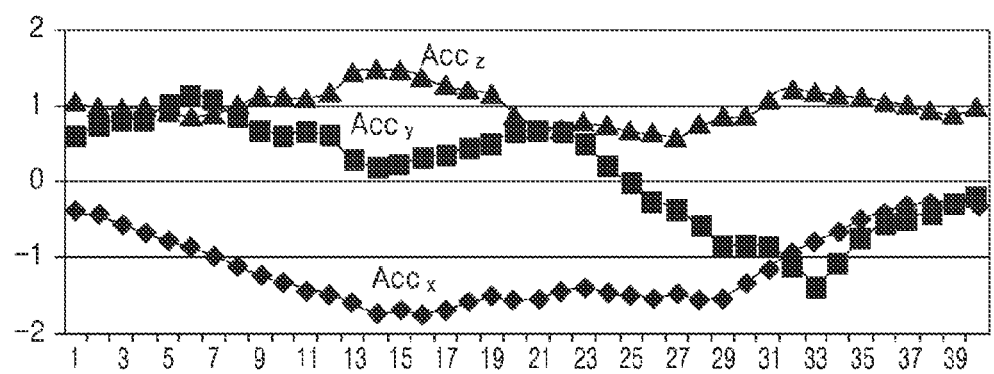

With respect to carrying out the gesture 242, once the start of the gesture 228 has been detected, the accelerometer data 202 is read and stored and the rotation correction 204 is carried out. The rotation correction 204 process executed by the gesture detection algorithm 108 is explained in more detail below. FIG. 10A shows an exemplary gesture corresponding to a movement towards the left of the upper extremity without wrist rotation (unnatural, robotic movement), where the X, Y, Z axes on which the accelerometer measures the acceleration are shown. In said Figure the portable device 1 is a smartwatch attached to the wrist of the user's 10 right arm. FIGS. 10B and 10C show a gesture corresponding to a lateral movement of the upper extremity with wrist rotation (a greater rotation in FIG. 10B than in FIG. 10O, but in both cases the user's 10 movements are more natural to carry out the gesture of lateral left movement. FIG. 10D shows a series of accelerometer readings 2 on the three axes for the lateral gesture without the wrist rotation shown in FIG. 10A, where the triangles represent the acceleration on the Z axis, the squares represent the acceleration on the Y axis and the rhombus represent the acceleration on the X axis. FIG. 10E shows a series of accelerometer readings 2 on the three axes for the lateral gesture with the wrist rotation of FIG. 10B.

According to a study carried out on different users, during the execution of a natural, lateral hand gesture, each user carries out different wrist rotations, which makes a wrist rotation correction necessary to be able to correctly identify the gesture carried out by the user on the corresponding axis, whether it is a movement to the right, left, up, down, circular rotation, etc. As shown in FIG. 10E, the accelerations on the Y and Z axes are modified depending on the rotation angle θ of the wrist, in such a way that the resulting acceleration vectors on both the Y and Z axes are a magnitude composition that is proportional to the rotation amplitude of the vector provided by the accelerometer in this same movement without wrist rotation. Said final value resulting from the previously mentioned composition is defined via the 3D rotation equation of a point, as shall be explained below.

This step is divided into two processes depending on the nature of the wrist rotation:
1. Fixed wrist rotation, where the complete gesture is carried out with the wrist rotated at a certain fixed angle (i.e. the wrist is not rotated whilst the gesture is being carried out, FIG. 10A).
2. Dynamic wrist rotation, where the wrist is rotated dynamically whilst the gesture is being carried out (FIGS. 10B and 10C).

With respect to the fixed wrist rotation, the initial rotation angle of the wrist is calculated taking into account the contribution of gravity to the values resulting from calculating the average of the last two acceleration values received from the accelerometer on the Y (averageY) and Z (averageZ) axes before the start of the gesture 200 is recognised (for this reason the system is continuously reading the accelerometer signal and storing the last two values received, which is not shown in FIG. 5 for the sake of simplicity). Given the aforementioned acceleration values on the Y and Z axes, the trigonometric arctangent function is used to obtain the rotation angle θ of the wrist, in radians: θ=arctan (averageY/averageZ).

Once the start of the gesture 200 is recognised, all the values given by the accelerometer are rotated in space in accordance with the angle θ using a basic Rx 3D rotation matrix (matrix of the 3D rotation of the wrist on the X axis) according to the following formula:

$$R_x = \begin{bmatrix} 1 & 0 & 0 \\ 0 & \cos\theta & -\sin\theta \\ 0 & \sin\theta & \cos\theta \end{bmatrix} \quad (2)$$

Then, said matrix is applied to the values provided by the accelerometer ($Acc_x$, $Acc_y$, $Acc_z$), in order to obtain the corrected acceleration vector ($Acc_x'$, $Acc_y'$, $Acc_z'$) for the wrist rotation:

$$(Acc_{x'}, Acc_{y'}, Acc_{z'}) = \begin{bmatrix} 1 & 0 & 0 \\ 0 & \cos\theta & -\sin\theta \\ 0 & \sin\theta & \cos\theta \end{bmatrix} \begin{bmatrix} Acc_x \\ Acc_y \\ Acc_z \end{bmatrix} \quad (3)$$

In this way, the gesture carried out with the wrist rotated at a certain angle θ may be compared to the same gesture carried out with the wrist in a neutral position, said neutral position being a rotation angle of 0 degrees.

With respect to dynamic wrist rotation, the gesture is assumed to be executed whilst the wrist is being rotated (FIGS. 10B and 10O). It may be carried out by calculating the changes of the wrist rotation angle whilst the gesture is carried out using the information supplied by a gyroscope and applying the above fixed wrist rotation technique to modify the accelerometer readings depending on the angle θ at any specific moment.

However, this would entail a limitation in the portable device due to the need to use an additional sensor and the greater battery consumption when the gyroscope is used. As a result, it is recommended that a different alternative approach be used. During the process of generating templates, or of generating a training data set, which is explained below, the possible gestures including wrist rotation are identified and recorded. In this way, for each recorded gesture there are the neutral gestures (carried out with 0° of wrist rotation) and the same gestures carried out with dynamic changes in the wrist rotation angle.

Figure 10F:
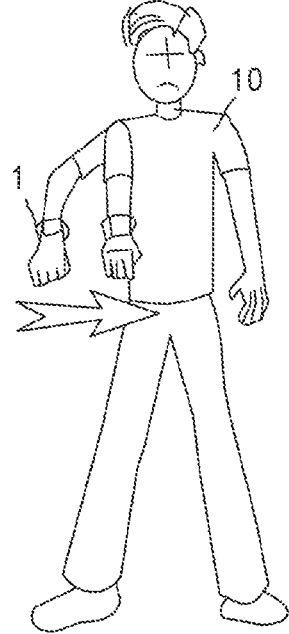
Figure 10G:
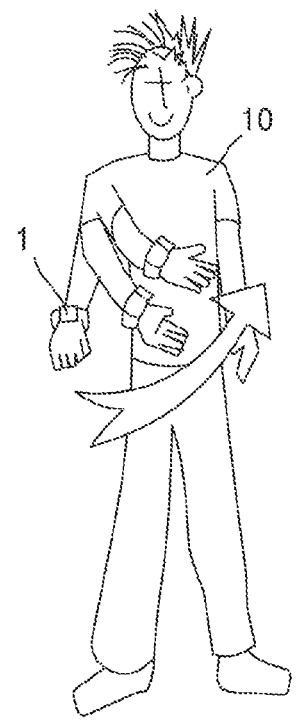

FIGS. 10F and 10G both show a lateral movement to the left of the portable device, but whilst FIG. 10F firstly shows a rigid and robotic movement, FIG. 10G shows a fluid and natural movement of the user, which is detected by the gesture detection algorithm 108 when the rotation correction 202 is applied, as has been explained.

It must be noted that everything referred to here as wrist rotation may be applied to any other joint, such as the elbow for example, if it is the one that carries out the rotation.

The standardisation process 206 to separate the strength of the gesture executed by the gesture detection algorithm 108 is explained in more detail below. The 2 accelerometer data resulting from the gesture carried out by the user exhibit disparity in gesture intensity between different users, and even disparity in the gesture intensity of by the same user when carrying out the same gesture twice in succession. This implies that although the shape of the signal may be very similar, the amplitude of the signals may differ from one sample to another, which makes it necessary to reduce the samples to a common scale in order to carry out the comparison. For this reason, the algorithm uses a standardisation process 206 that includes a normalisation in the samples in order to obtain zero average and a normalisation by standard deviation. The standardisation formula used is the following:

$$X' = \frac{X - \mu}{\sigma} \quad (4)$$

where $\mu$ is the average of the measurements carried out and a is the standard deviation of the same, X being the original accelerometer measurement and X' the standardised measurement. The standardisation formula may be used globally or independently for each axis. Thus, the standardised X' values that are positive imply values above the average, while X' values that are negative imply values below the average. Moreover, the X' values are scaled down with respect to the original X values, in such a way that the data is transformed so that they are represented using the same scale amplitude.

Figure 11A:
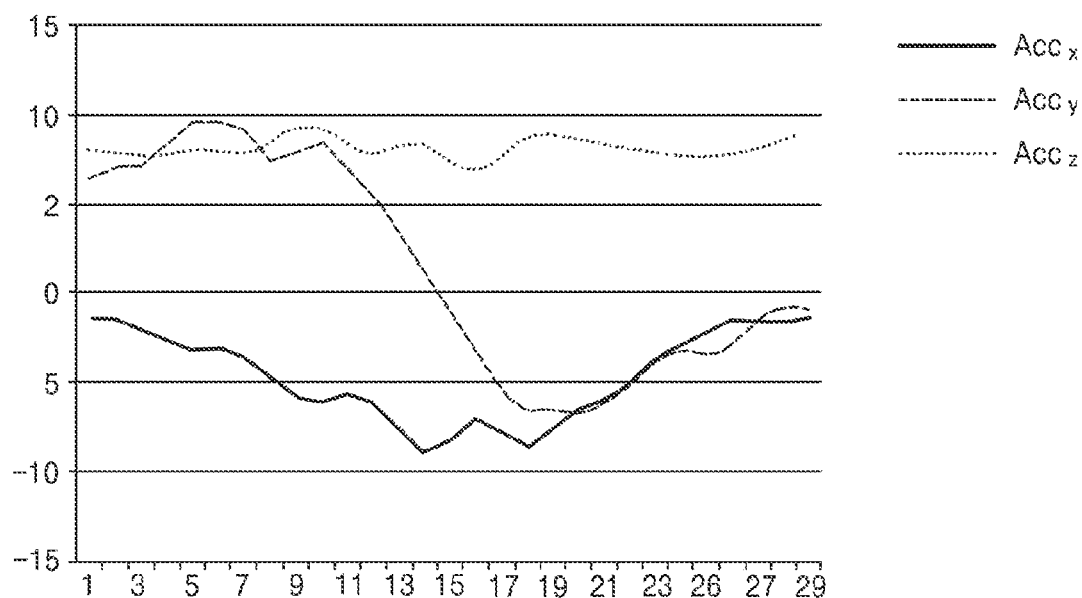
FIGS. 11A and 11B respectively show acceleration data of original samples and standardised acceleration data according to the average and standard deviation of the original samples.
Figure 11B:
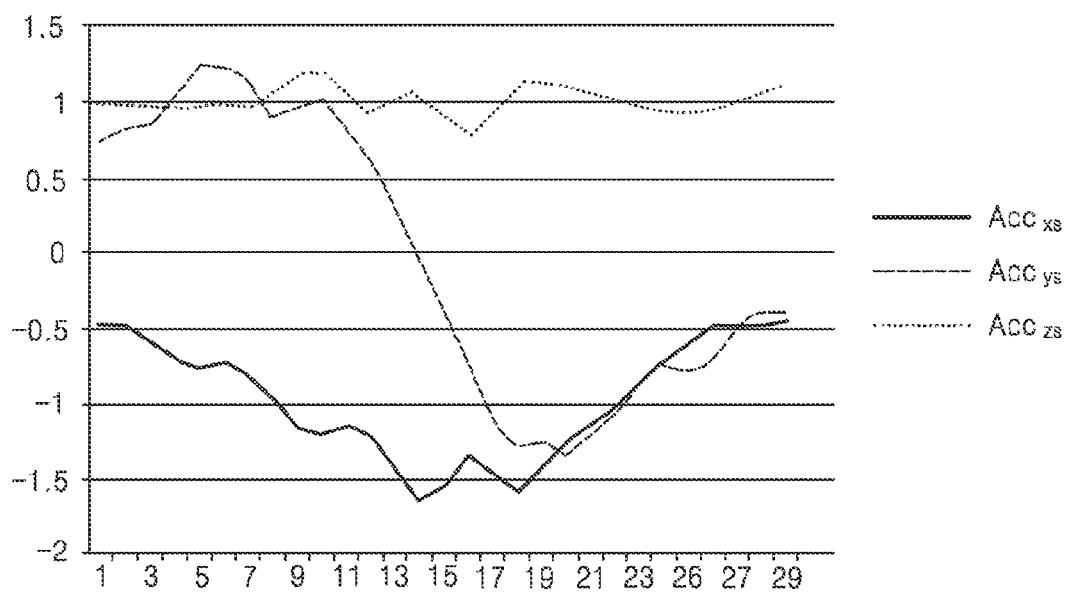

FIG. 11A an example of original data obtained by the accelerometer ($Acc_x$, $Acc_y$, $Acc_z$) on the three axes for a horizontal movement to the left, where a more or less constant magnitude may be seen on the Z axis due to the contribution of gravity. FIG. 11B shows the global standardised data from FIG. 11A (according to the average $\mu$ and the standard deviation a of the measurements shown in FIG. 11A) for the three axes ($Acc_{xs}$, $Acc_{ys}$, $Acc_{zs}$), and thus it may be seen that the proportionality between the axes is maintained.

When the standardisation is carried out while the accelerometer is still supplying data, the final average and standard deviation is unknown, such that an approximation must be calculated with the current and known data. The solution is to calculate, for each point, the average and standard deviation for the known points, which is an approximation, but the solution converges the real values when they receive the last point. Equation (5) shows the modified standardisation, where the average $\mu$ is substituted with the modified average $\overline{X_n}$ for the sample n, as obtained from equation (6), and the standard deviation a is substituted with the modified standard deviation $\overline{\sigma_n}$ for sample n, obtained through equation (7).

$$x_{Sn} = \frac{x_n - \mu}{\sigma} \rightarrow x_{Sn} = \frac{x_n - \overline{X_n}}{\overline{\sigma_n}} \quad (5)$$

Equations (6) and (7) enable each pair of averages and standard deviations to be calculated given the previously known values, so as to thus improve the speed of calculation, where n is the number of the corresponding sample, $x_n$ is the last sample value and $\overline{X_{n-1}}$ is the value of the modified average for the previous sample, n−1.

$$\mu \rightarrow \overline{X_n} = \frac{\overline{X_{n-1}} * (n-1) + x_n}{n} \quad (6)$$

$$\sigma \rightarrow \overline{\sigma_n} = \sqrt{\frac{1}{(n-1)}\left[\left(\sum_{i=0}^{i=n} x_i^2\right) + \left(\overline{X_n}\right)^2 * n - 2 * \overline{X_n} * \left(\sum_{i=0}^{i=n} x_i\right)\right]} \quad (7)$$

Both whilst the gesture is being carried out 242 and once the gestured has ended 262, it may be checked whether the gesture is valid. FIG. 5 shows an optional phase for checking the validity of the gesture 208 (once the standardisation phase 206 is finished) and another optional phase for checking the validity of the gesture 211 (once the gestured has ended). It must be taken into account that the whilst the gesture is being carried out, different events may occur that cause the gesture to be rejected and not be considered as valid, for example, if a gesture is carried out very forcefully, or for a very long period of time, or with a high elbow tilt angle. A gesture may also be rejected if the number of samples captured during the gesture is extremely low, which occurs for movements that are too short.

Thus, in a preferred embodiment, a gesture is considered as too short if, once carried out, the gesture does not exceed a certain threshold (40 samples in one particular embodiment). Similarly, a very long gesture, made up of a number of samples above a certain threshold (150 samples, in one particular case), is also rejected. Of course, rather than taking the number of samples captured whilst the gesture is carried out as the parameter to check of the movement is too short or long, a time parameter may be used. Thus, if the gesture is carried out in less time than a configured time it is considered as a very short movement and if it is carried out over a long period of time it is considered as a very long movement.

In addition, it may also occur that a movement is executed abruptly and suddenly, and very forcefully. In this case the gesture detection algorithm cannot precisely determine the gesture carried out, since gestures carried out very forcefully cause accelerometer saturation.

Figure 12:
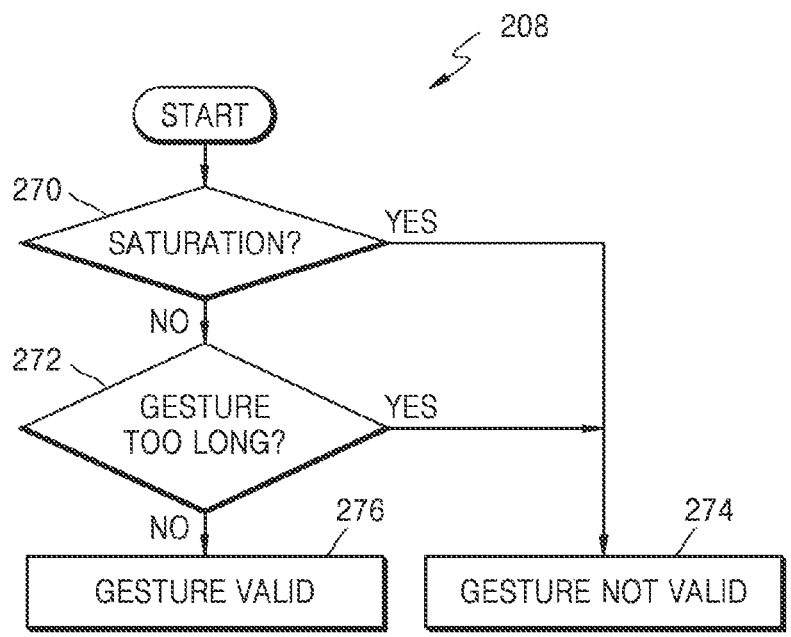
FIG. 12 shows an optional first phase for checking the validity of the gesture.

FIG. 12 shows an optional first phase for checking the validity of the gesture 208. As the end of the gesture 262 is still not available for the check carried out in this first phase 208, the gesture is being carried out and it is still not known whether the gesture is too short until it ends. However, other aspects can be checked in this phase, such as if the gesture that is being carried out is too long or if saturation of the accelerometer has occurred.

In this phase 208, firstly, it may be checked if the accelerometer has been saturated 270. To detect if a movement is carried out very forcefully, it is checked whether the accelerometer is saturated over a certain number of consecutive samples on one or more axes. In one particular embodiment it is considered that this occurs if, during the duration of the gesture, two not necessarily consecutive points are detected as having at least two of the components thereof marked at a value equal to or greater than 2G. If so, the gesture is considered as invalid 274.

Then (or before, or at the same time), it may be checked whether the gesture is too long 272, for example if the number of samples of the gesture that is being carried out exceeds a certain threshold. Once all the relevant checks have been successfully passed, the gesture is considered to be valid 276. It must be noted that this phase of checking the validity of the gesture 208, carried out whilst the gesture is carried out, is optional; it may be carried out at another time and may include one or several different checks from among those referred to.

Figure 13:
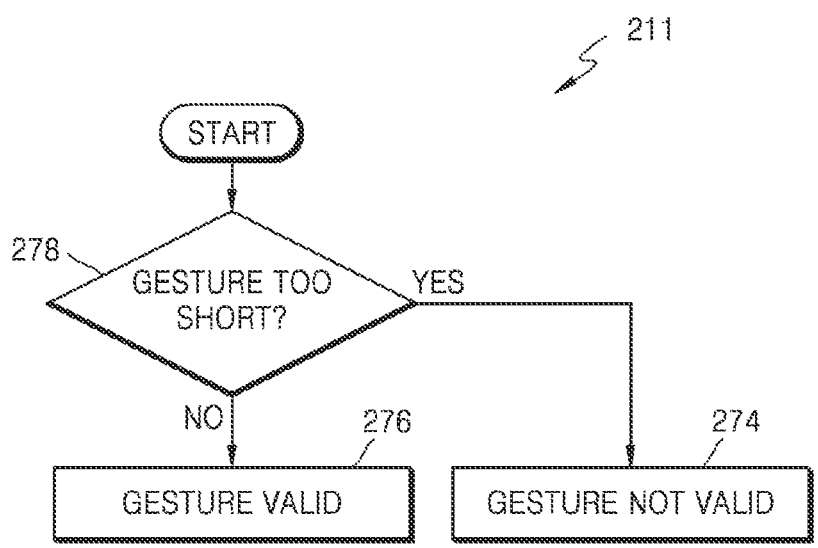
FIG. 13 shows an optional second phase for checking the validity of the gesture.

Similarly, FIG. 13 shows the second optional phase of checking the validity of the gesture 211, which is carried out once the gesture has ended 262. In this case, it may be checked whether the gesture carried out is too short 278, for example if the number of samples of the gesture does not exceed a certain threshold. If so, the gesture is considered as invalid 274, and if not, it is a valid gesture 276. Likewise, this second phase of checking the validity of the gesture 211, carried once the gesture has ended, is optional and may also include one or several different checks from among those already referred to. Thus, for example, a single phase of checking the validity of the gesture may be carried out, once the gesture has ended, where all the checks are carried out (saturation 270, gesture too long 272 and gesture too short 278).

Once the end of the gesture is detected 210, and the validity of the gesture 211 is optionally checked, the identification 212 of the gesture executed by the user is carried out. For this purpose, different automatic learning algorithms (such as the Hidden Markov model, for example) may be used as well as other known comparative models (SVM, Neural Networks, etc.) that measure the similarity between two data time sequences with templates or reference data 214, such as the Dynamic Time Warping (DTW) algorithm for example, which is not strictly an automatic learning algorithm, but rather an algorithm to measure the similarity between two time sequences that may vary in the time instant or speed. The actual movement of the user, the movement carried out, is compared to the gesture templates that have been previously obtained in a training phase.

In a preferred embodiment, the DTW algorithm is used combined with a template system (comparing the gestures captured to previously stored reference data 214), although the gesture identification may be carried out in multiple other forms, such as via automatic learning for example. The DTW algorithm used in a possible embodiment is described in detail below.

The DTW algorithm is a method that calculates an optimal match between two sequences with certain restrictions. The sequences are aligned non-linearly in the time dimension to determine a measure of their similarity independently of certain non-linear variations in the time dimension.

The DTW algorithm obtains a quantitative distance between two given sequences. The formula of the distance D is based on the Euclidean distance.

$$D=\sqrt{(x1-x2)^2+(y1-y2)^2+(z1-z2)^2} \quad (8)$$

The gesture detection algorithm was tested where training has been carried out with a set of samples including the gravity information and with a set of samples where gravity has been filtered with a high-pass filter. It has been proven that the DTW algorithm works better using samples in the training that include the gravity information (92.125% success ratio when using gravity information against 85.826% success ration when using gravity-filtered information).

The use of the DTW algorithm generally requires $O(N^2)$, N being the number of sequence samples. The notation O is used to represent the order of execution time and memory complexity of an algorithm. That it is $n^2$ means that the complexity increases quadratically, i.e. that as the amount of data to process increases, the execution time increases parabolically. While this is not optimal, as the gesture detection algorithm 108 works with a fixed and not very high number of samples, around 70 samples to define a gesture, it is not especially affected.

However, a new real-time variant of the DTW algorithm with O(N) complexity may be used to accelerate the calculation, with which the DTW distances may be calculated for each new sample from the accelerometer 2. The basis of this variant is to distribute the calculation of each column of the DTW cost matrix over the time available between two samples from the accelerometer 2 of the portable device 1. In one particular embodiment, the available time is 20 ms (the accelerometer sampling time), such that as soon as the user finishes carrying out the gesture, the algorithm knows the value of the minimum distance and has obtained the tag of the detected gesture 218 because the entire DTW cost matrix has already been completed. This method greatly improves the DTW calculation speed and separates it from the size of the gesture (the number of samples that a gesture requires). To accelerate the calculation known automatic learning methods may also be used, such as the aforementioned "Hidden Markov" for example.

Figure 14:
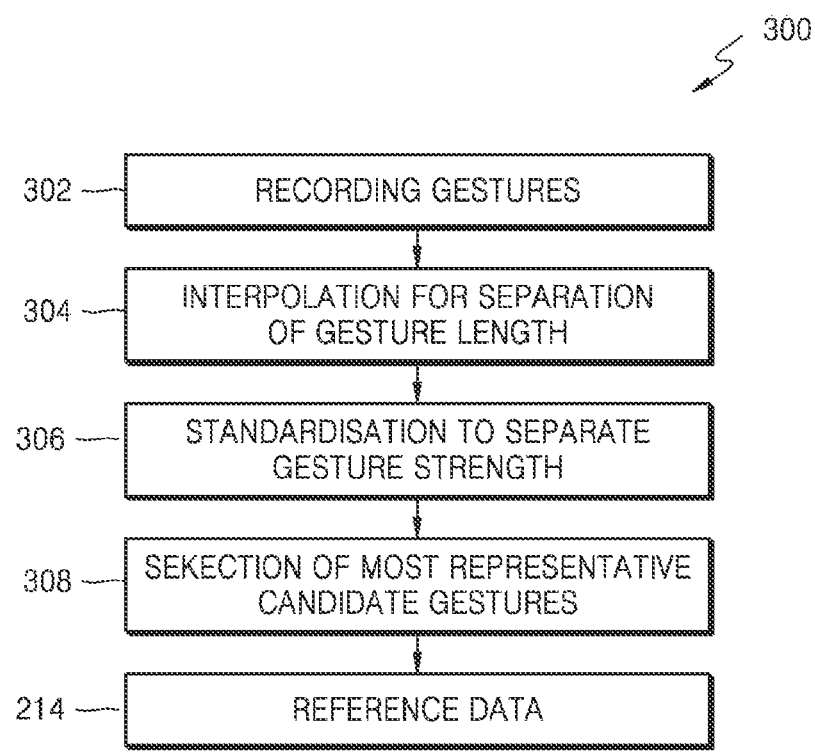
FIG. 14 shows a diagram of the learning phase or process for generating templates.

FIG. 14 explains in detail the learning phase, or template generating process 300, through which the reference data 214 are obtained, which are used in the gesture detection algorithm 108. Gesture detection requires a set of reference data describing each of the gestures to be identified, which may be whichever ones that are desired to be identified, regardless of their complexity or duration. These may be called templates or training data sets, which must be generated for each new gesture that one wishes to identify. To obtain said templates it is necessary to firstly record each gesture 302 to be used as reference, and subsequently process each gesture separately to obtain the reference data 214 (once these are obtained, every time the user executes a gesture, the accelerometer information is compared to the training data set, reference data 214, and depending on the comparison result the gesture is duly classified and tagged 218).

The recording of gestures 302 comprises segmenting the data from the accelerometer 2 as previously explained. Segmentation comprises:

Gravity filtration (using a high-pass filter on the accelerometer data).
  Detecting the start of the gesture: when the filtered acceleration module exceeds a certain threshold.
  Carrying out the gesture, for which the raw, unfiltered accelerometer data is used.
  Ending the gesture: when the filtered acceleration module falls below the threshold during a certain number of consecutive times.

Figure 15:
FIG. 15 shows an example of interpolation via splines from values registered by the accelerometer.

Then, interpolation is carried out to separate the length of the gesture 304, with the purpose of standardising the length of all the recordings and improving the precision of the gesture detection during the comparison phase. In this phase, the data from the accelerometer corresponding to the gesture carried out by the user are shared with an initial set of training data. To standardise all the gestures recorded to the same length, an interpolation method is used. In a preferred embodiment, interpolation via splines is used, instead of polynomial interpolation, since the interpolation error may be small even when low-degree polynomial splines are used. Given a series of points that describe a gesture, additional points are inferred using this type of interpolation that complete the recording until the desired length is reached, without distorting the formal recording of the signal. FIG. 15 shows an interpolation via splines, where the circular points are the values registered by the accelerometer and the square points are the values inferred by the interpolation method.

The next phase is standardisation 206 to separate the strength of the gesture, using the standardisation method previously explained.

The most representative candidate gestures 308 are then selected. The main problem of the set of training data is that the accelerometer data obtained for one single gesture, for example a hand movement to the left, may be completely different from one repetition to another, even when the same user carries them out, due to the fact that the gesture may be carried out with a different intensity, arm position, angle, etc. When making up the set of training data, several recordings are used for each gesture rather than one. Once several recordings for each gesture are obtained, the recordings that are most representative of each gesture must be selected. Various known methods may be used for this purpose: affinity propagation and comparison by raw strength of K iteration cross-validation.

Given that both algorithms generate a different set of templates, and the evaluation methods of the results are dissimilar, via a battery of tests with cross-validation sets (i.e. a set of recorded gestures that have been maintained separate and have not been used in the learning phase), it is empirically tested which of the two algorithms offers the best success rate. These algorithms, Affinity Propagation and K iterations, are executed for each gesture to be trained.

Figure 16:
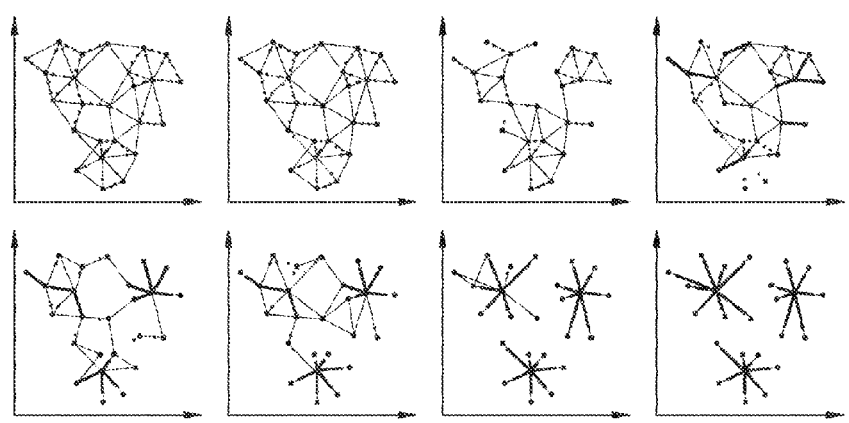
FIG. 16 shows different iterations carried out with the affinity propagation method in the learning stage.

The grouping of data by identification of a subset of representative examples is important for processing signals from a sensor and detecting patterns in the data. The affinity propagation method takes as input similar measurements between pairs of data points. Messages indicating the level of quality of all the possible groupings between all the data points are exchanged (for simplicity, point refers to the acceleration data of a recorded repetition of a gesture) until a set of high-quality examples and the corresponding data groupings are gradually obtained. These groupings are around a core, and this core is interpreted as the most representative of the grouping; therefore, it is the one that is included in the training set. Samples obtained by different users for the same gesture are used as input data, which means repeating the process for each gesture to be identified by the portable device. FIG. 16 shows different iterations carried out with this affinity propagation method. To carry out the data grouping, affinity propagation takes as input data a distance matrix that indicates the level of difference between each of the objects to be grouped with the others, i.e. how different one sample is with respect to another. This step is crucial since the affinity propagation bases its calculations on this data and the final result depends on them. For this reason, and given the nature of the examples (two gestures that are the same and may be carried out with a different duration and intensity), the use of the DTW algorithm (Dynamic Time Warping) as explained above is considered, since this algorithm, which is widely used in automatic speech recognition, enables the difference between two signals to be calculated, regardless of the time or the energy that is used to carry out the gesture.

Cross-validation is a validation technique to evaluate how the results of statistical analysis may be generalised to an independent set of data. It is mainly used when estimating how precisely a predictive model will work in practice. A given group of N data, K elements or K groups of elements are used for training, and the rest to validate the prediction model obtained. As our set of training data may be considered small (N≤15), it is feasible to data train with all the possible combinations without repeating the elements of a set of N data and find which of all the possible combinations generates the best predictive model. Equation (9) shows all the possible combinations without repetition given N elements.

$$\sum_{k=1}^{N} \frac{N!}{k!(N-k)!} \quad (9)$$

For example, given N=12 elements, the number of all the possible combinations for data training is 4095. Greater sets of training data result in an exponential increase in the number of possible combinations and computing time.

With respect to the trigger signal, in the diagram of FIG. 4 the existence of a trigger signal or activation signal check was shown in phase 104. The purpose of this trigger signal is to determine the moment at which the user is going to start a gesture order (or several consecutive gesture orders). The nature of the trigger signal may vary greatly:

- A voice command (for which the portable device 1 uses a microphone and speech recognition techniques).
- A touch signal, for example a tap on the touchscreen or carrying out a gesture on the touchscreen.
- The activation of a button of the portable device.
- A gesture carried out over the portable device. Thus, in the case of a smartwatch, it may be bringing the watch close to the user's face or making a certain movement (for example, making a certain shape in the air—a square, circle, letter, etc.).

In cases where the trigger signal itself is a gesture carried out by the upper extremity of the user on which the portable device is placed, the identification of the specific gesture carried out takes place similarly to the manner previously explained for gesture commands, using the gesture detection algorithm 108 (with the difference that in this case the algorithm is not waiting for a trigger signal, but rather it is continuously active checking the user's gestures). For example, the gesture may be an abrupt movement in any direction that exceeds the acceleration threshold or that even manages to saturate the accelerometer.

In addition to the fact that the nature of the trigger signal may be very varied, the trigger signal or activation signal may be used to include additional information therein. The additional information that this trigger or activation signal may include is information about device selection and/or information about device function.

The device selection information is used to determine which device one wishes to interact with within the user's surroundings, since there may be several devices with which it could communicate (smart and wireless control devices are increasingly popular in the home and in our surroundings in general). Thus, gesture selection triggers may be used, i.e. a specific sequence of arm movements that trace a path in the determined space, thus detected by the accelerometer, which is linked to a specific device. For example, a square may be linked to a television, a downward-facing triangle to the air conditioning, and an upwards-facing triangle to the refrigerator).

The device function information is used to determine what specific function in a device one would like to control. Thus, gesture command triggers may be used, i.e. a specific sequence of arm movements that trace a path in the set space, detected by the accelerometer, which is linked to a specific function in a device that one wishes to control. For example, a circle may indicate that the control of the audio function of a device is desired, such that the command gesture that is then executed will be interpreted for this function (for example, downwards to turn the sound down, upwards to turn the sound up, to the right to skip to the next song and to the left to go back to the last song).

It may also be the case that there are combined trigger gestures, which simultaneously determine in and of themselves the device being referred to and the function.

Figure 17A:
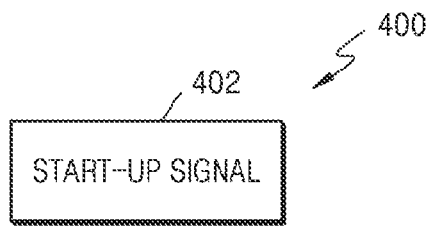
FIGS. 17A and 17D show the content of different trigger signals.

FIGS. 17A, 17B, 17C and 17D show the contents of different trigger signals 400. The simplest is, as shown in FIG. 17A, that the trigger signal 400 does not carry additional information, and is only used as a mere start-up signal 402 to monitor the user's gesture (command gestures) from there and interpret them as orders. Thus, energy savings in the portable device 1 may be achieved, since only the command gesture is checked when the trigger signal is activated, via a tap on the touchscreen for example.

Figure 17B:
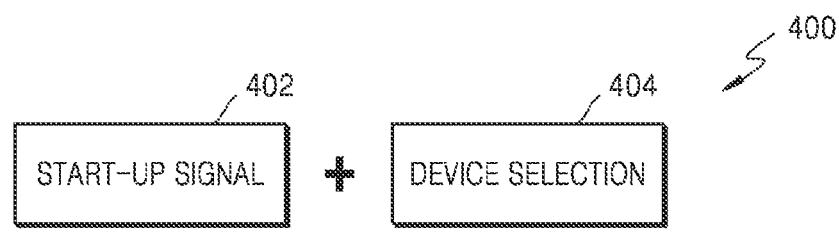

FIG. 17B shows a trigger signal 400 in which, apart from the information inherent to a start-up signal 402, it carries device selection information 404 to determine which device is going to be controlled.

Figure 17C:
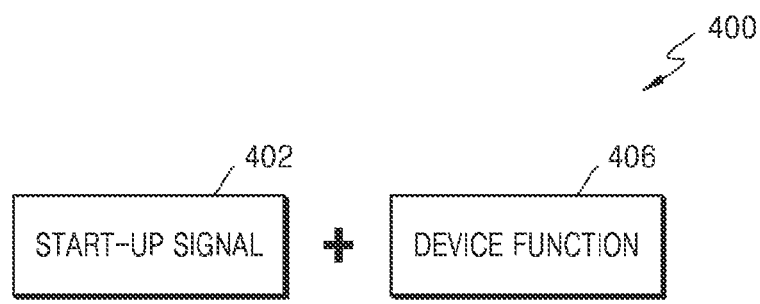

FIG. 17C shows a trigger signal 400 in which, apart from the information inherent to a start-up signal 402, it carries device function information 406 to determine which function is going to be controlled in the device being interacted with. For example, it may be the case that the portable device 1 is configured to control a single specific device through command gestures, for example only controlling the portable device 1 itself or only controlling the television. In this way, it is not necessary to specify the device selection information 404.

Figure 17D:
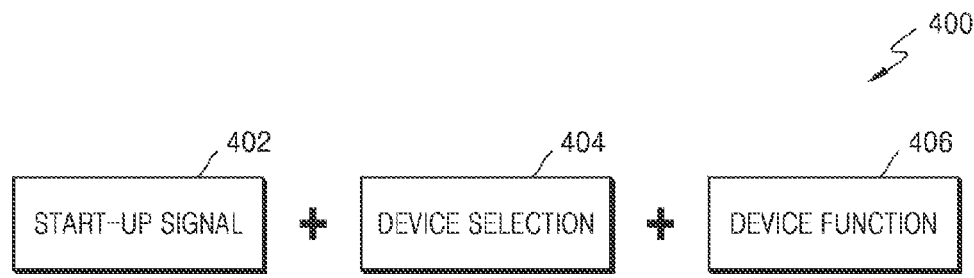

FIG. 17D shows a trigger signal 400 in which, apart from the information inherent to a start-up signal 402, it carries device selection information 404, and device function information 406 to determine which device is going to be controlled and which function of said device is going to be controlled with the subsequent command gesture(s). In this case, the gesture carried out for the trigger signal may be a single gesture or even a combination of consecutive gestures (for example, a square to select the device and a triangle to then choose the function of the device to be controlled).

Figure 18A:
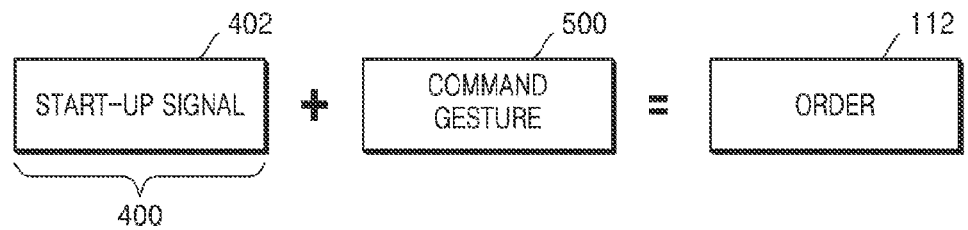
FIGS. 18A and 18B show several examples of obtaining orders from a trigger signal (with additional information) and a command gesture.
Figure 18B:
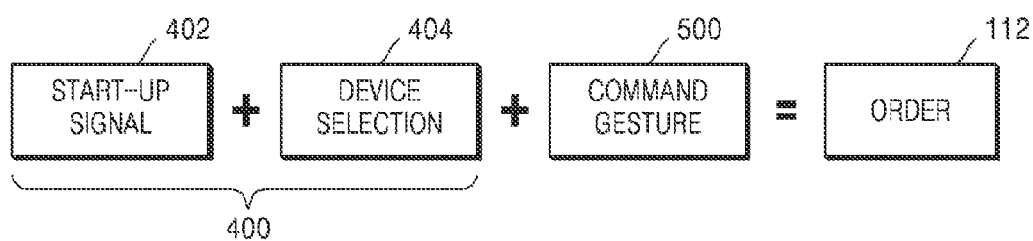

Including additional information in the trigger signal 400, device selection information and/or device function selection, has a wider application when a gesture is used as a trigger signal. Thus, a trigger signal 400 that is only used as a signalling signal 402, activates the gesture detection command 500 to obtain the precise order 112 (FIG. 18A). If the user uses a gesture as a trigger signal 400, it may indicate the selected device 404 with the gesture, and then execute the command gesture 500 to obtain the specific order that it wishes to execute in the selected device (FIG. 18B).

To develop the order 112, different alternatives may be considered. For example, that the trigger signal is only a start-up signal 402 and that the command gesture 500 includes the additional device selection and/or device function information, apart from the specific order it is referring to. The client application installed in the portable device 1 is in charge of step 112 (see FIG. 4) for correctly constructing the specific order from the information supplied by the trigger signal 400 and for the command gesture 500. Thus, it takes into account the device to which it has to send the order 114 and the specific coding of the message depending on the order, all this supported by a database that contains the different order that may be sent to the devices and a table that connects each gesture to the specific order.

Figure 19A:
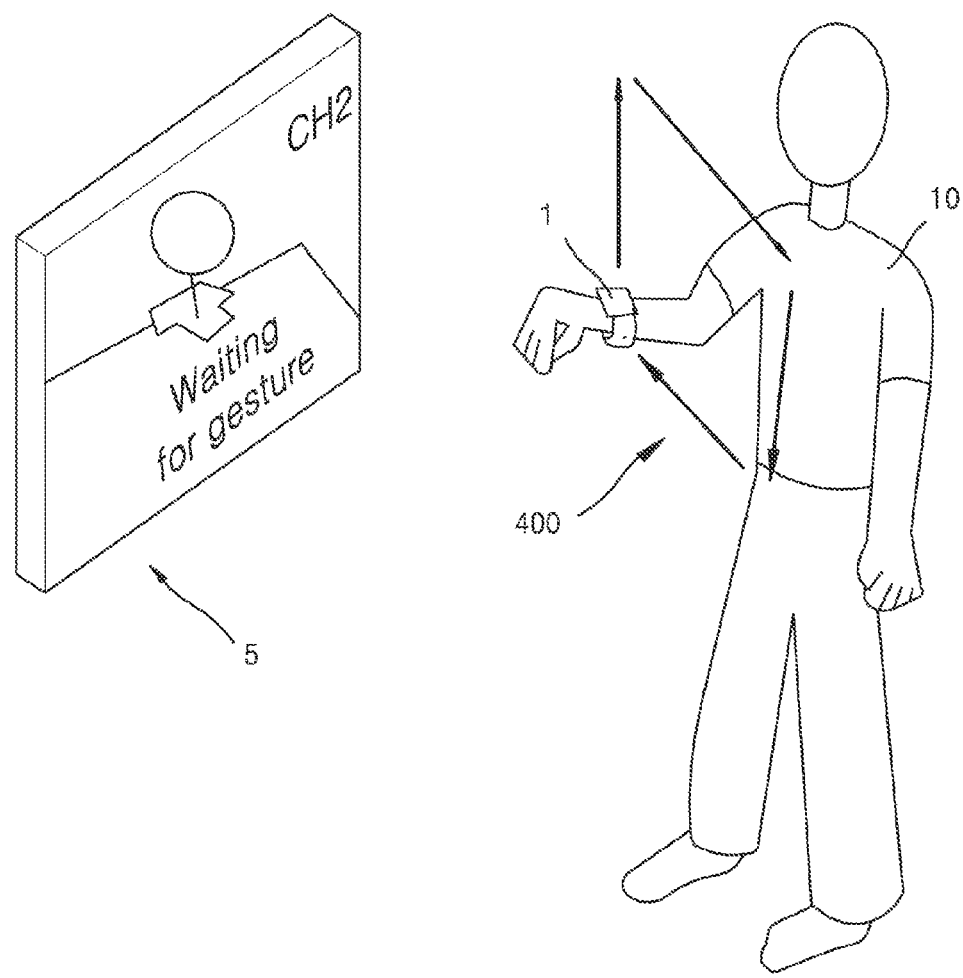
FIG. 19A shows a trigger signal being carried out via a gesture to select the television as the device to be controlled.
Figure 19B:
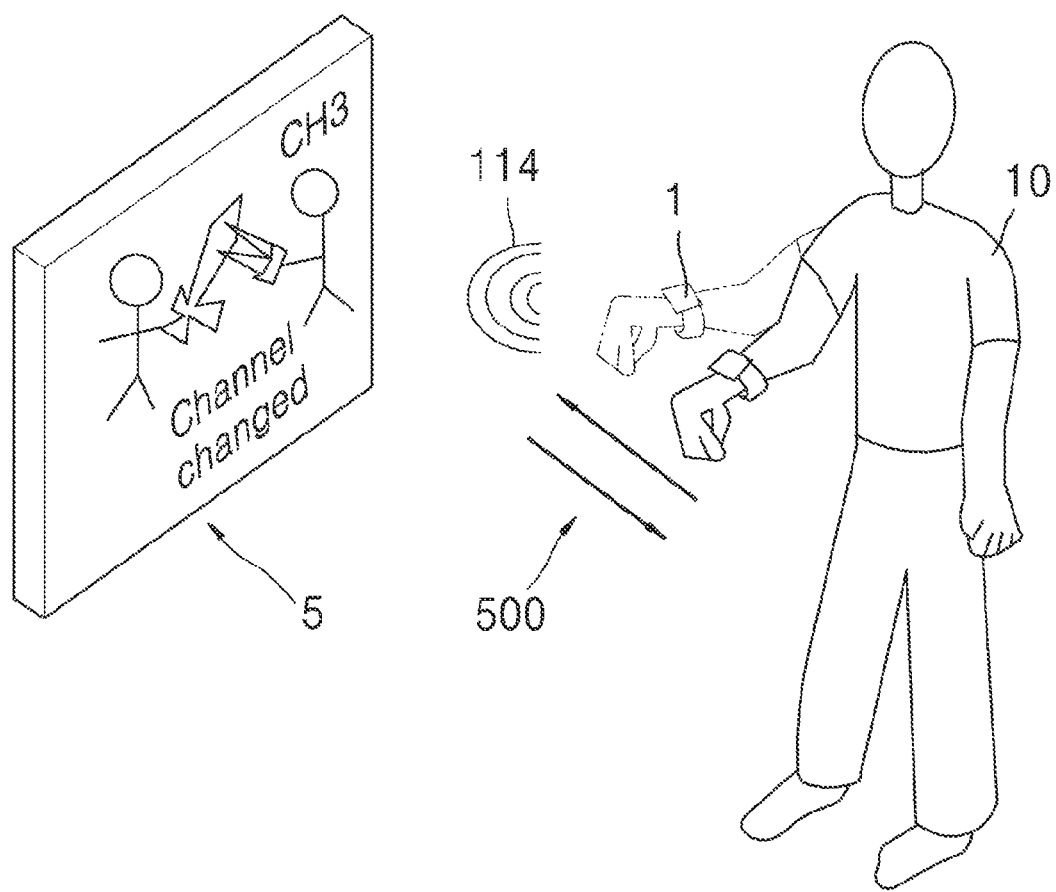
FIG. 19B shows a command gesture subsequently carried out to change the television channel.

FIG. 19A shows the embodiment of a trigger signal 400 via a square-shaped gesture executed by the right arm of a user 10 carrying a portable device 1 (a smartwatch). This square-shaped gesture is a trigger signal 400 that carries device selection information 404 to link the portable device 1 to a specific external device 5 (in this case a television). Subsequently, as shown in FIG. 19B, the user 10 executes a command gesture 500, an arm movement to the right and then to the left, that the portable device 1 identifies and translates into an order 112 to change the television channel, and sends it wirelessly 114 to the television 5 so that it may execute the change of channel (in the example, the television changes from channel #2 to channel #3).

Figure 20A:
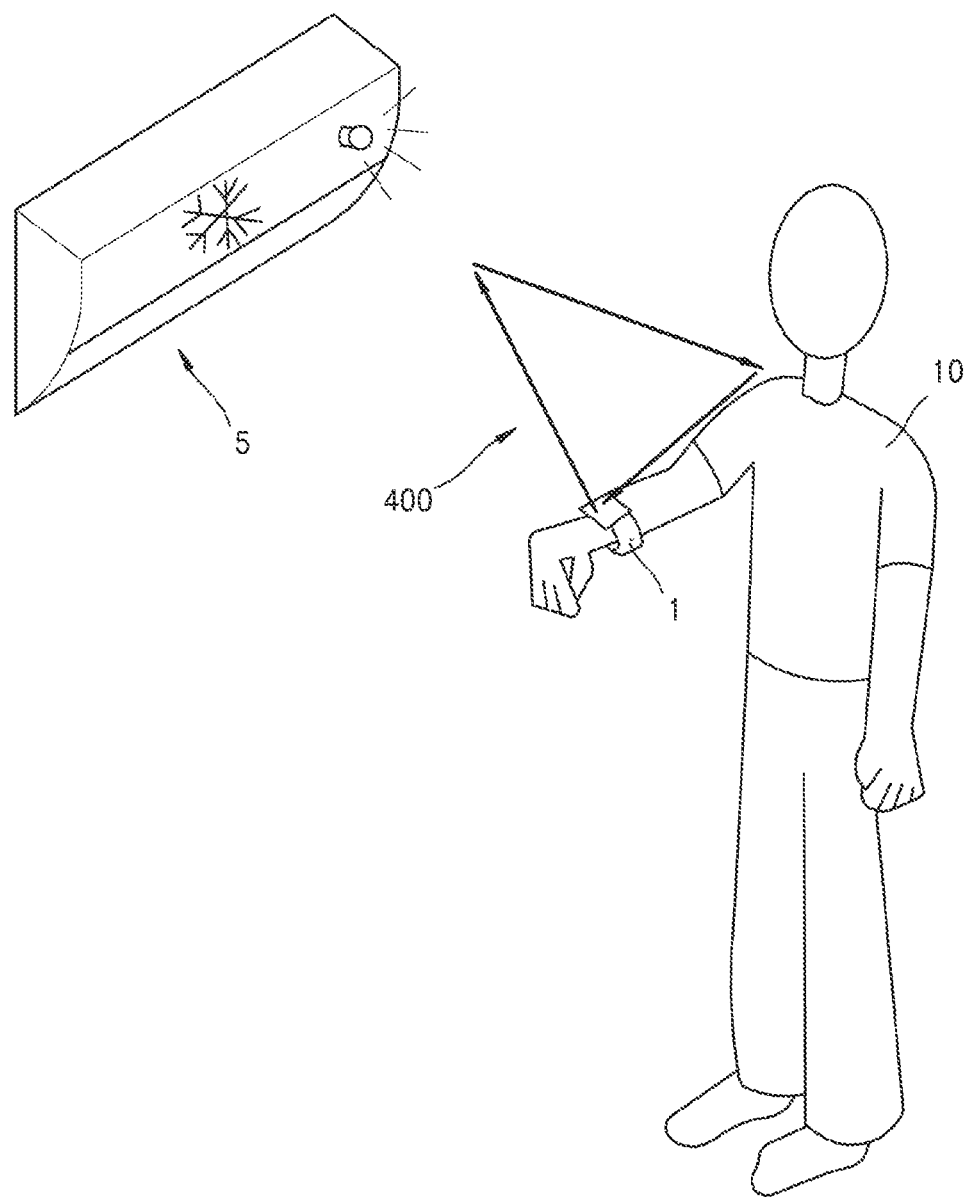
FIG. 20A shows a trigger signal being carried out via a gesture to select the air conditioner as the device to be controlled.
Figure 20B:
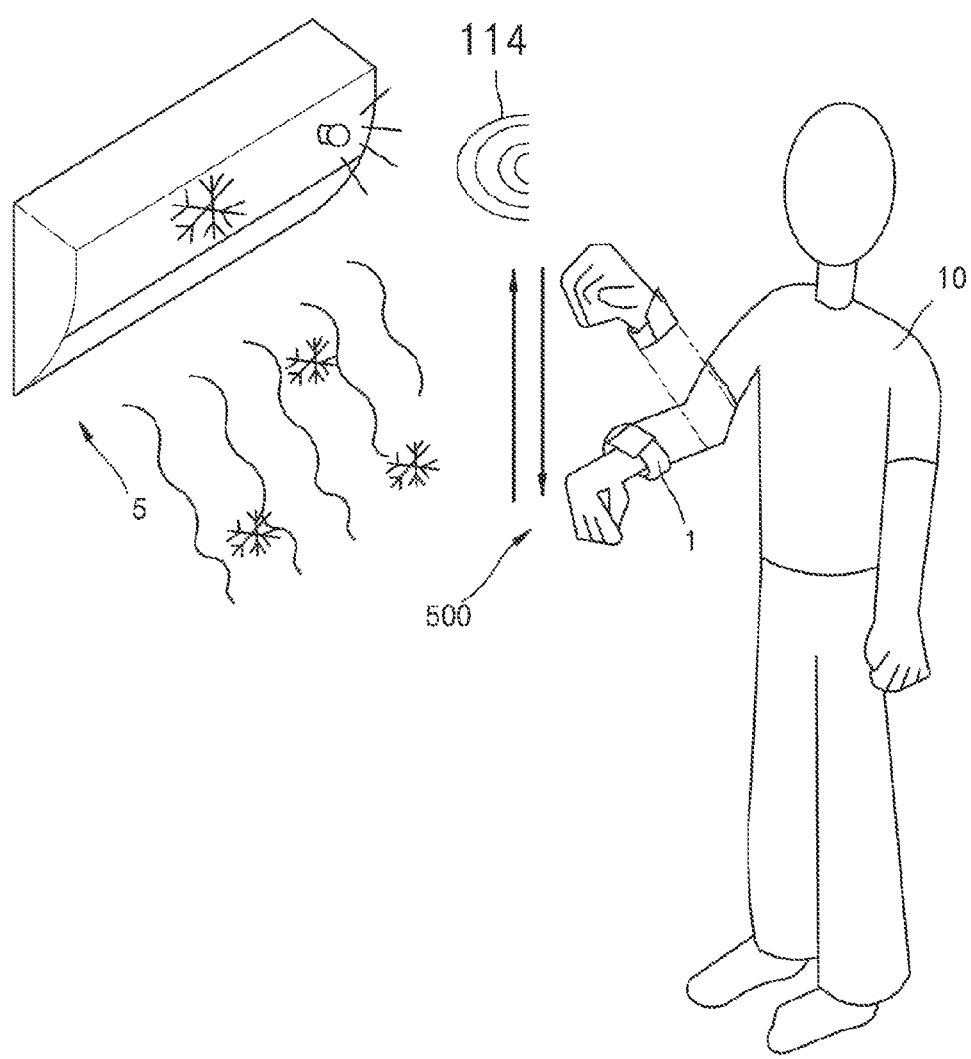
FIG. 20B shows a command gesture subsequently carried out to increase the strength of the air conditioning.

FIG. 20A shows the execution of a trigger signal 400 via a downwards-facing triangle-shaped gesture. This specific gesture is a trigger signal 400 that carries device selection information 404 to link the portable device 1 to a specific external device 5 (in this case the air conditioning). According to FIG. 20B, the user 10 subsequently executes a command gesture 500, an upwards and then downwards arm movement, that the portable device 1 identifies and translates into an order 112 to change the strength of the air conditioning and sends it wirelessly 114 to the air conditioner 5 so that the latter may execute the order (in the embodiment, the intensity of the air conditioning is increased).

Therefore, in the embodiments of FIGS. 19A, 19B, 20A, 20B, the user 10 executes a trigger gesture 400 that includes the selection of an external device (a specific appliance, for example) and then executes the gestures linked to the action (command gesture 500), which is translated into an order 112 that is sent 114 to the appliance 5. The appliance 5 is on standby and when it receives the order 122, it processes it 124 and executes 126 it.

Another possible way of generating the trigger signal 400 is via contact triggers with the touchscreen of the portable device 1. Thus, the touch-sensitive surface of the screen is pressed one or several times with one or several fingers, either on any area thereof or on an area defined for this purpose, in order to put the external device 5 on standby for gesture triggers. For example, a tap on the screen starts the gesture recognition and a gesture moving the hand towards the right and then bringing it back to the start position makes the music player skip a song.

Another possible way of generating the trigger signal 400 is via mechanical triggers, via actuating mechanisms of the portable device (buttons, levers, etc.) that start the gesture recognition mode via accelerometer 2.

Figure 21A:
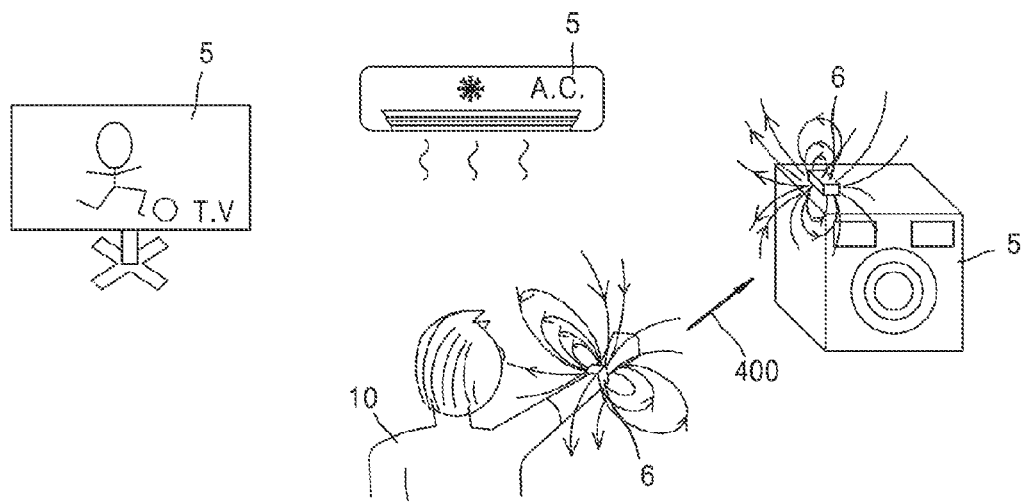
FIG. 21A shows a trigger signal being carried out via magnetometer to select the washing machine as the device to be controlled.

FIG. 21A shows the execution of a trigger signal 400 via a magnetic field trigger, via a magnetometer. The external device 5 selection, which must execute actions linked to the commands traced by gesture triggers of the portable device 1, use calculations based on the magnetic fields analysed by a magnetometer 6 situated in the portable device that is controlled via gesture triggers (for example, "point" the smartwatch at the washing machine to select this device and make gestures by moving the hand upwards and downwards to send a turn-on order 114 for the washing machine, which is received and executed by the washing machine).

Figure 21B:
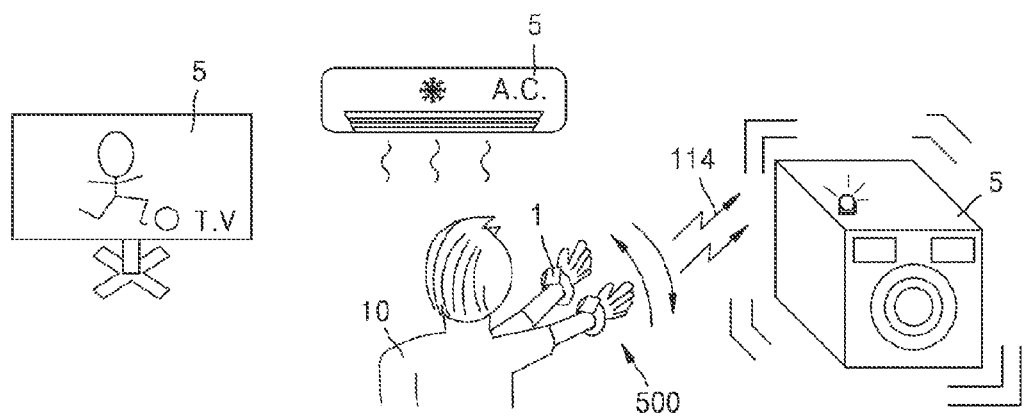
FIG. 21B shows a command gesture subsequently carried out to turn on the washing machine.
Figure 22A:
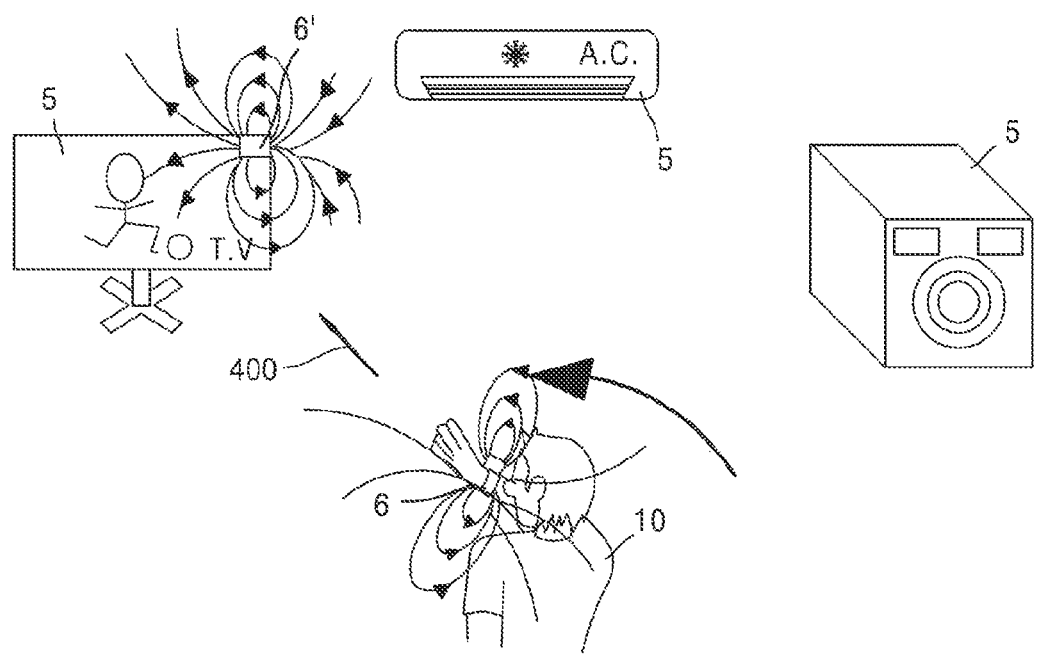
FIG. 22A shows a trigger signal being carried out via magnetometer to select the television as the device to be controlled.
Figure 22B:
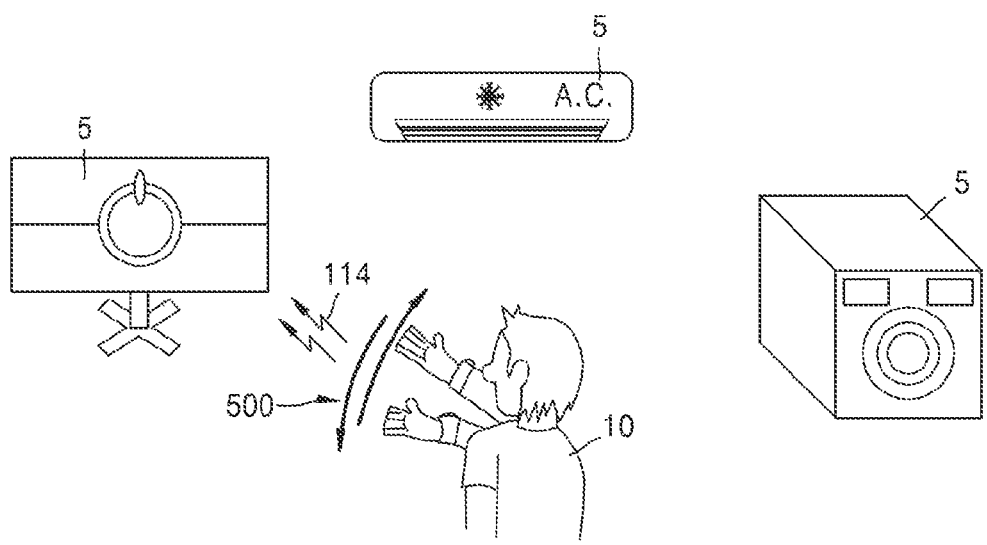
FIG. 22B shows a command gesture subsequently carried out to turn off the television.

FIGS. 22A and 22B show another example of executing a trigger signal 400 via a magnetic field trigger, in a manner similar to FIGS. 21A and 21B. In this case, the magnetometer 6 of the portable device 1 is pointed towards the magnetometer 6' of the television to select this device. Then, the command gesture 500 is carried out to turn off the television (lift and lower the arm) and the television turns off.

The trigger signal 400 may also be executed via a light transceiver (either by visible light, infrared or other frequencies) to select the external device 5 to be controlled via a gesture. Thus, if the portable device 1 were able to communicate with the external device 5 via VLC (visible light communication), through which information is transmitted using the visible light spectrum emitted by a white LED and received via a photo-luminescent receiver, such as the light sensor that all mobiles have to control screen brightness, in such a way that the device is able to identify encrypted information at a frequency that is not visible to the human eye. Given that any device that produces light (television, lamps, etc.) via LEDs may emit in this way, the portable device 1 only has to point towards it, identify which device it is via the light said device emits (television, refrigerator, stereo equipment) and automatically send the command linked to a gesture for this device.

Figure 23:
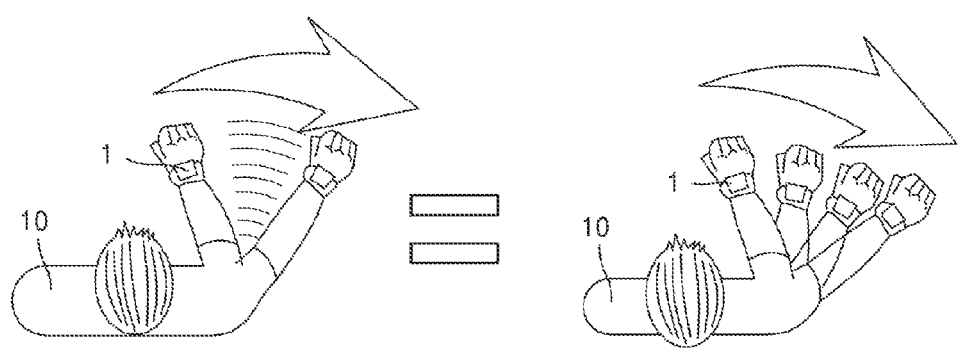
FIG. 23 shows the same movement executed quickly (left) and slowly (right), where both are identified as identical by the device when standardisation is applied to separate the strength of the movement.

FIG. 23 shows the same gesture executed quickly (left) and slowly (right), whether it is a command gesture 500 or a trigger signal gesture 400. FIG. 5 has already explained the standardisation steps to separate the strength of the gesture 206. Gestures made in the same direction and orientation will be considered by the gesture detection algorithm 108 as equivalent ("=" in FIG. 23) despite being carried out with a different intensity or taking a different amount of time to be carried out.

Figure 24A:
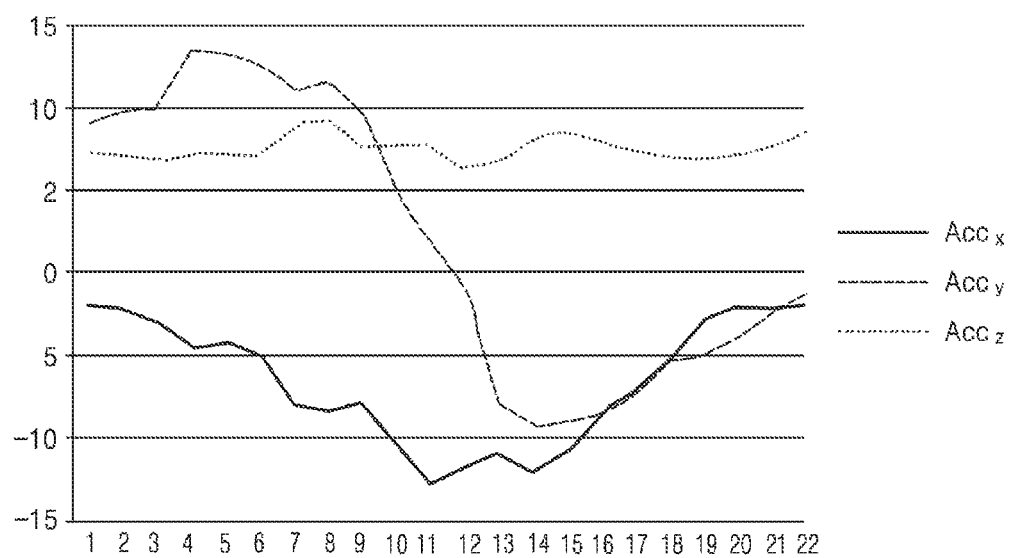
FIGS. 24A and 24B respectively show the graph of accelerations captured by the accelerometer whilst the fast movement to the left is carried out and the acceleration graph for the slow movement to the left.
Figure 24B:
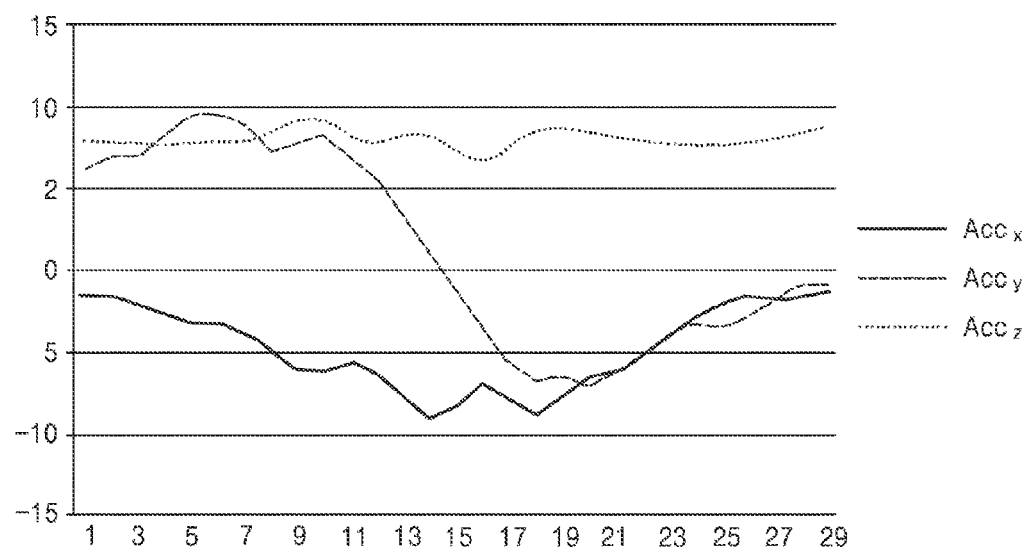

Two equivalent gestures may be carried out at a faster or slower speed; therefore, they are differentiated by the number of points and the amplitude of the signals collected, despite having the same shape, or a similar shape. FIG. 24A shows the graph of accelerations captured by the accelerometer whilst the quick movement to the left was carried out. The length of this horizontal gesture is 22 points with amplitudes on the X and Y axes that exceed 10 m/s while gravity on the Z axis remains stable. FIG. 24B shows the graph of accelerations captured by the accelerometer whilst the slow movement to the left is carried out. The length of this horizontal gesture is 29 points, therefore slower than the previous one, and smoother, with amplitude points on the X and Y axes that do not exceed 10 m/s while gravity on the Z axis remains stable.

Figure 25A:
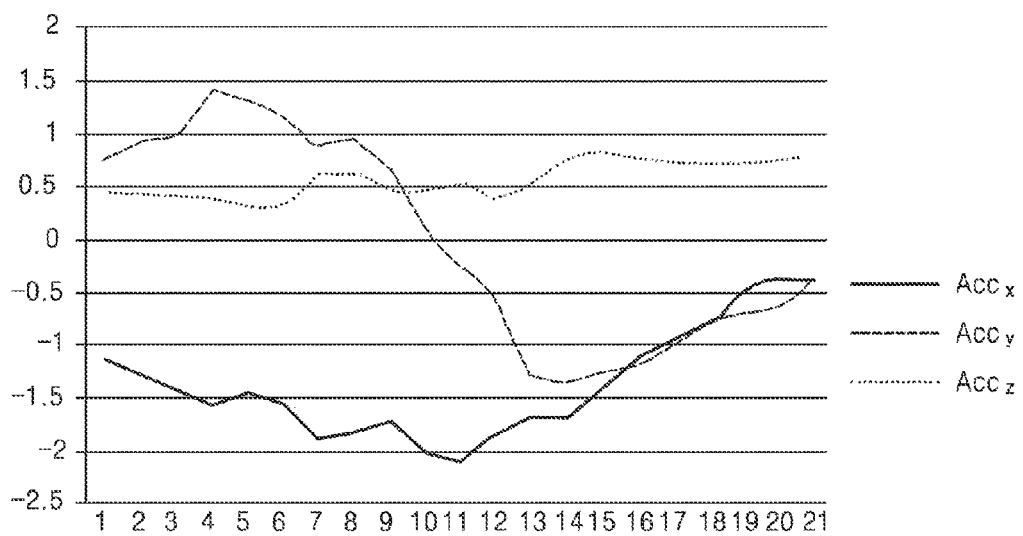
FIGS. 25A and 25B respectively show the standardised acceleration data of FIGS. 24A (fast movement) and 24B (slow movement).
Figure 25B:
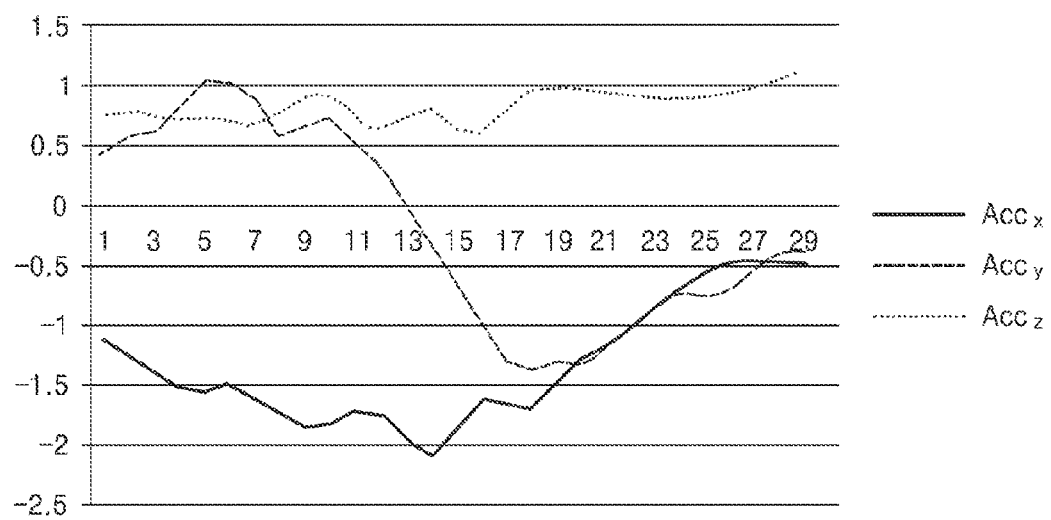

To homogenise the amplitudes between two similar movements, it is necessary to standardise the sample but, given that the movement detection algorithm analyses the concordant points as they are generated by the sensor, it is not possible to carry out a typical standardisation since the average and standard deviation of the sample are not known until the gesture ends. The solution consists of applying the standardisation with the average and typical deviation of the data collected as they arrive from the sensor (equation 6 and 7), which is an approximation to the average and deviation of the entire sample and that converge to it when the last point arrives. FIG. 25A shows the standardised acceleration data of FIG. 24A (quick movement), while FIG. 25B shows the standardised acceleration data of FIG. 24B (slow movement). It may be seen that once both movements are standardised, both graphs are very similar, in both magnitude and shape.

Figure 26:
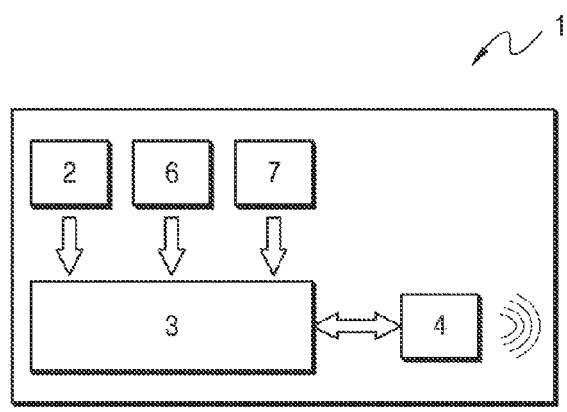
FIG. 26 shows an embodiment of the portable device with an accelerometer, magnetometer and gyroscope.

Lastly, it must be indicated that while an accelerometer is used to obtain the accelerations of the portable device 1 on the three axes, the readings of the accelerometer may be complemented by other sensors installed in the portable device 1, such as a magnetometer and a gyroscope, to obtain greater precision in detecting gestures carried out. FIG. 26 shows the portable device 1 with an accelerometer 2, magnetometer 6 and gyroscope 7. Any of said sensors may already be incorporated within the control unit 3, rather than being external entities as shown in the figure.

The magnetometer is a sensor that provides absolute orientation on the three axes with regard to the Earth's magnetic pole, which means that the information obtained with the magnetometer varies according to the location of the sensor on the surface of the Earth. Individually, the information that it supplies cannot substitute that of the accelerometer to differentiate two translational movements, since completely different movements may be made without any variation in the orientation with respect to the Earth's magnetic pole. Likewise, two completely different movements may have identical variations with respect to the orientation of the Earth's magnetic pole. The information that the magnetometer supplies along with the information from the accelerometer may be useful in applications where the absolute orientation of the device is needed with respect to the Earth's surface, since it may also give sufficient information to estimate relative positions between two devices, if they are opposite or parallel to each other, etc., such as the device selection by magnetometer application of FIGS. 21A, 21B, 22A, 22B.

With regards to the gyroscope, this sensor enables the angular speed of a body relative to the reference system thereof to be obtained. The rotations or angular velocity variations of a body are produced when the forces to which it is submitted are not applied to its centre of gravity and, similarly to the accelerometer, the data obtained ideally do not vary regardless of the location of the sensor at any point of the Earth's surface. Individually, the information obtained from this sensor may not substitute the information provided by the accelerometer since translational movements in space may not generate any angular movement, but its combined use along with the accelerometer provides sufficient information so as to differentiate two movements in which there is an identical translation of a body, but with a different relative angular movement. Therefore, its combined use with the accelerometer may improve precision in differentiating two different movements. Moreover, the use of a gyroscope in combination with an accelerometer enables the direction of the gravity vector to be more precisely obtained even when the device is not on standby since the amount the device has rotated may be estimated by integrating the angular velocity and, therefore, the wrist rotation may be corrected more precisely throughout the entire execution of a movement.

Therefore, the use of the accelerometer is essential in the present invention and it may not be individually substituted by a magnetometer or a gyroscope, but their use in combination with the former may provide additional information for different applications or for greater precision in differentiating different movements.

The above-described device may be implemented by hardware components, software components, and/or any combination thereof. For example, the devices and components described in the exemplary embodiments may be implemented by using processors, controllers, arithmetic logic units (ALUs), digital signal processors, microcomputers, microcomputers, field programmable arrays (FPAs), programmable logic units (PLUs), microprocessors, any other devices that may execute and respond to instructions, or one or more general-purpose computers or special-purpose computers.

Processing units may execute an operating system (OS) and one or more software applications executed in the OS. Also, the processing units may access, store, operate, process, and generate data in response to the execution of software.

For convenience of understanding, it may be described that one processing unit is used. However, those of ordinary skill in the art will understand that the processing unit may include a plurality of processing elements and/or various types of processing elements. For example, the processing unit may include a plurality of processors or a processor and a controller. Also, the processing unit may include any other processing configurations such as parallel processors.

Software may include computer programs, codes, instructions, or any combination thereof, and may construct the processing unit for desired operations or may independently or collectively command the processing unit.

In order to be interpreted by the processing unit or to provide commands or data to the processing unit, software and/or data may be permanently or temporarily embodied in any types of machines, components, physical devices, virtual equipment, computer storage mediums or devices, or transmitted signal waves. Software may be distributed over network coupled computer systems so that it may be stored and executed in a distributed fashion. Software and data may be stored in one or more computer-readable recording mediums.

The methods according to the exemplary embodiments may be embodied in the form of program commands executable through various computer means, which may be recorded on a computer-readable recording medium. The computer-readable recording medium may include program commands, data files, and data structures either alone or in combination. The program commands recorded on the computer-readable recording medium may be those that are especially designed and configured for the exemplary embodiments, or may be those that are known and available to computer programmers skilled in the art.

Examples of the computer-readable recording medium include magnetic recording media such as hard disks, floppy disks and magnetic tapes, optical recording media such as CD-ROMs and DVDs, magneto-optical recording media such as floptical disks, and hardware devices such as ROMs, RAMs and flash memories that are especially configured to store and execute program commands.

Examples of the program commands include machine language codes that may be generated by a compiler, and high-level language codes that may be executed by a computer by using an interpreter.

The above hardware devices may be configured to operate as one or more software modules to perform operations according to the exemplary embodiments, and vice versa.

Although the exemplary embodiments have been described with reference to the accompanying drawings, those of ordinary skill in the art will understand that various changes and modifications may be made therein. For example, the relevant results may be achieved even when the described techniques are performed in a different order than the described methods, and/or even when the described components such as systems, structures, devices, and circuits are coupled or combined in a different form than the described methods or are replaced or substituted by other components or equivalents.

Therefore, the scope of the inventive concept should be defined not by the described exemplary embodiments alone, but by the appended claims and the equivalents thereof.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

The invention claimed is:

1. A portable device comprising:
a sensor configured to sense movements of the portable device on an arm of a user;
a control unit, implemented by at least one hardware processor, configured to identify, based on sensing data from the sensor, a trigger signal and a gesture of the user, select an external device among a plurality of external devices based on the trigger signal, and determine an order for controlling the selected external device based on the gesture; and
a communication unit, implemented by at least one hardware transceiver, configured to transmit a command signal corresponding to the order to the selected external device,
wherein the control unit is configured to identify the trigger signal and the gesture of the user by performing a rotation correction to separate a rotation of the gesture from a movement of the portable device with respect to the gesture.

2. The portable device of claim 1, wherein the rotation correction comprises obtaining an initial angle of rotation of the gesture on an axis of the portable device and rotating acceleration data according to the initial angle of the rotation using a rotation matrix.

3. The portable device of claim 1, wherein the portable device further comprises a gyroscope, and the control unit is configured to perform the rotation correction using data obtained from the gyroscope.

4. The portable device of claim 1, wherein the control unit is configured to check validity of the gesture based on one or more of whether the sensor is saturated, whether duration of the gesture exceeds a first threshold, and whether the duration of the gesture is shorter than a second threshold.

5. The portable device of claim 1, wherein the portable device is a wearable device.

6. The portable device of claim 1, wherein the control unit is configured to standardize acceleration data to separate strength of the gesture, and
standardization of the acceleration data is performed using an average and a standard deviation of the acceleration data while the gesture is being made.

7. The portable device of claim 1, wherein the control unit determines the external device corresponding to the gesture by comparing the gesture with previously stored reference data, and selects a first order corresponding to the gesture from a plurality of orders for controlling the external device.

8. The portable device of claim 1, wherein the sensor is an acceleration measurement module configured to measure acceleration, and
acceleration data of the gesture is obtained using the acceleration measurement module, and the gesture is identified using the acceleration data.

9. The portable device of claim 8, wherein the sensor comprises a magnetometer, and the control unit identifies the gesture based on data obtained using the magnetometer.

10. The portable device of claim 1, wherein a gravity is filtered from samples of acceleration data and a filtered acceleration module is calculated based on the filtered samples.

11. The portable device of claim 10, wherein the control unit is configured to determine a start and an end of the gesture based on a comparison between the filtered acceleration module and a threshold value.

12. The portable device of claim 10, wherein the filtered acceleration module is calculated according to the following formula:

$$\sqrt{(Acc_x^2 + Acc_y^2 + Acc_z^2)}$$

where ($Acc_x$, $Acc_y$, $Acc_z$) represents acceleration components of the acceleration data after filtering the gravity.

13. The portable device of claim 1, wherein in response to the trigger signal, the control unit is further configured to start reading a continuous sequence of acceleration data received from the sensor, separate a finite number of samples of acceleration data from the continuous sequence of acceleration data, and determine a start of the gesture and an end of the gesture based on the finite number of samples of acceleration data.

14. A method of operating a portable device, the method comprising:
sensing, by a sensor based on movements of the portable device on an arm of a user;
identifying, based on sensing data from the sensor, a trigger signal and a gesture of the user, selecting an external device among a plurality of external devices based on the detected trigger signal;
identifying the detected gesture;
determining an order for controlling the selected external device based on the identified gesture; and
transmitting a command signal corresponding to the order to the selected external device,
wherein the identifying the trigger signal and the gesture of the user comprises performing a rotation correction to separate a rotation of the gesture from a movement of the portable device with respect to the gesture.

15. The method of claim 14, wherein the rotation correction comprises obtaining an initial angle of rotation of the gesture on an axis of the portable device and rotating acceleration data according to the initial angle of rotation using a rotation matrix.

16. The method of claim 14, wherein the portable device further comprises a gyroscope, and wherein the rotation correction is performed using data obtained from the gyroscope.

17. The method of claim 14, wherein the identifying of the detected gesture further comprises checking validity of the gesture based on one or more of whether the magnetometer is saturated, whether duration of the gesture exceeds a first threshold, and whether the duration of the gesture is shorter than a second threshold.

18. The method of claim 14, further comprising standardizing acceleration data to separate strength of the gesture,
wherein the standardizing the acceleration data is performed using an average and a standard deviation of the acceleration data while the gesture is being made.

19. The method of claim 14, wherein the determining of the external device and the order for controlling the external device comprises comparing the identified gesture with previously stored reference data, determining the external device corresponding to the gesture based on results of the comparing the identified gesture, and selecting a first order corresponding the gesture from a plurality of orders for controlling the external device.

20. The method of claim 14, wherein the portable device comprises an acceleration measurement module configured to measure acceleration, and
the identifying of the detected gesture comprises obtaining acceleration data of the gesture from the acceleration measurement module and identifying the gesture using the acceleration data.

21. A non-transitory computer-readable recording medium having recorded thereon a program for executing a method of operating a portable device, the method comprising:
sensing, by a sensor, movements of the portable device on an arm of a user;
identifying, based on sensing data from the sensor, a trigger signal and a gesture of the user,
selecting an external device among a plurality of external devices based on the detected trigger signal;
identifying the detected gesture;
determining an order for controlling the selected external device based on the identified gesture; and
transmitting a command signal corresponding to the order to the selected external device,
wherein the identifying the trigger signal and the gesture of the user comprises performing a rotation correction to separate a rotation of the gesture from a movement of the portable device with respect to the gesture.

* * * * *